United States Patent
Mizuno et al.

(10) Patent No.: US 10,275,439 B2
(45) Date of Patent: Apr. 30, 2019

(54) INFORMATION PROCESSING DEVICE, DISPLAY METHOD AND CONTROL PROGRAM

(71) Applicant: PFU LIMITED, Kahoku-shi, Ishikawa (JP)

(72) Inventors: Yusuke Mizuno, Kahoku (JP); Kazuya Maeda, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 15/116,147

(22) PCT Filed: Mar. 20, 2014

(86) PCT No.: PCT/JP2014/057876
§ 371 (c)(1),
(2) Date: Aug. 2, 2016

(87) PCT Pub. No.: WO2015/141006
PCT Pub. Date: Sep. 24, 2015

(65) Prior Publication Data
US 2017/0132192 A1    May 11, 2017

(51) Int. Cl.
*H04N 1/00*    (2006.01)
*G06F 17/21*    (2006.01)
(Continued)

(52) U.S. Cl.
CPC .......... *G06F 17/243* (2013.01); *G06F 3/0346* (2013.01); *G06Q 10/10* (2013.01);
(Continued)

(58) Field of Classification Search
CPC .... G06F 17/243; G06F 17/212; G06F 9/4443; G06F 17/30905; G06G 3/0346;
(Continued)

(56) References Cited

U.S. PATENT DOCUMENTS 8,706,762 B1 *   4/2014   Patzer ............... G06F 17/30867
                                                         707/790
2008/0082909 A1 * 4/2008   Zuverink ............. G06F 3/0481
                                                         715/224
(Continued)

FOREIGN PATENT DOCUMENTS

JP   2003-58811    2/2003
JP   2003-141438   5/2003
(Continued)

OTHER PUBLICATIONS

International Search Report dated Jun. 24, 2014 for corresponding International Application No. PCT/JP2014/057876 including English translation, 5pp.
(Continued)

*Primary Examiner* — Quoc A Tran
(74) *Attorney, Agent, or Firm* — Lewis Roca Rothgerber Christie LLP

(57) ABSTRACT

There is provided an information processing device, display method, and control program, which can improve usability for a user when the user utilizes a business form using the information processing device. The information processing device includes an operation module for receiving an input by a user, a display module, and a display control module for, according to an input by a user using the operation module, switching and displaying, on the display module, a first display image where item input fields are placed respectively at a plurality of item entry positions in an image that represents a business form and a second display image where the item input fields and information that indicates items to be input in the item input fields are placed alongside without displaying the image that represents the business form.

6 Claims, 24 Drawing Sheets

(51) Int. Cl.
| | |
|---|---|
| *G06F 17/24* | (2006.01) |
| *G06Q 10/10* | (2012.01) |
| *G09G 5/391* | (2006.01) |
| *G06F 3/0346* | (2013.01) |
| *G06F 3/0484* | (2013.01) |
| *G06F 3/0488* | (2013.01) |
| *G06F 17/00* | (2019.01) |

(52) U.S. Cl.
CPC .......... *G09G 5/391* (2013.01); *G06F 3/0484* (2013.01); *G06F 3/04886* (2013.01); *G06F 17/212* (2013.01); *H04N 1/00222* (2013.01)

(58) Field of Classification Search
CPC ............. G06G 3/04886; G06G 3/0484; H04N 1/00222; G06Q 10/10; G09G 5/391
See application file for complete search history.

(56) References Cited

U.S. PATENT DOCUMENTS

| | | | | |
|---|---|---|---|---|
| 2010/0138732 | A1* | 6/2010 | Bowden | ............... G06F 3/04883 715/221 |
| 2012/0302210 | A1 | 11/2012 | Miyazaki | |
| 2013/0205189 | A1* | 8/2013 | DiPierro | ............... G06F 3/0483 715/224 |
| 2017/0322912 | A1* | 11/2017 | Craven | .................... G06F 17/24 |

FOREIGN PATENT DOCUMENTS

| | | |
|---|---|---|
| JP | 2005-92596 | 4/2005 |
| JP | 2007-219774 | 8/2007 |
| JP | 2010-288243 A | 12/2010 |
| JP | 2012-79188 | 4/2012 |
| JP | 2012 079188 A | 4/2012 |
| JP | 2012-247927 A | 12/2012 |
| WO | WO 2008/042126 A2 | 4/2008 |

OTHER PUBLICATIONS

Office action dated Dec. 20, 2016 in related JP Patent Application No. 2016-508431 including partial Eng. translation 8pp.
MacPeople Editorial Department, iPhone 5 complete guide, ASCII Media Works, Inc., Oct. 25, 2012, First Edition, p. 252, including partial Eng. translation 7pp.
Ito, Hanako, special report, easy final return on Internet, Nikkei PC, Nikkei Business Publications, Inc., Feb. 13, 2012, vol. 643, pp. 66-69, including partial Eng. translation 5pp.
JP Office action regarding JP Patent Application No. 2016-508431 corresponding to U.S. Appl. No. 15/116,147, dated Jun. 8, 2017 (dated Jun. 13, 2017), 4 pages and an English machine translation thereof.
European Search Report for the corresponding European Patent Application No. PCT/JP2014057876, dated Jul. 11, 2017, 7 pages.
Marcotte, Ethan. *Responsive Web Design* [Book]. (2011), pp. 1-157, Publisher: A Book Apart, New York, NY, US.
Gujarati, Paresh. "Overview of Sensors Used in SmartPhones and Tablets." Techulator website: http://www.techulator.com/resources/9421-Overview-sensors-used-smartphones-tablets.aspx (posted Mar. 23, 2013), 11 pages.
European Office Action dated Jul. 6, 2018 regarding European Patent Application No. 14886094.3 corresponding to U.S. Appl. No. 15/116,147 (8 pages).
Chinese Office Action dated Oct. 15, 2018 regarding Chinese Patent Application No. 201480076809.0 corresponding to U.S. Appl. No. 15/116,147 (11 pages) with English Translation (13 pages).
European Summons to attend oral proceedings dated Feb. 11, 2019 regarding European Patent Application No. 14886094.3 corresponding to U.S. Appl. No. 15/116,147 (8 pages).

* cited by examiner

FIG. 2

| | | | 210 |
|---|---|---|---|

INVOICE

作成日(Date) : June 30, 2009
作成地(Place) : JAPAN

| ご依頼主(Sender) :<br>Taro Fujitsu<br>X-X-X, Higashishinbashi<br>Minato-ku TOKYO<br>000-0000, JAPAN<br>TEL : 99-9999-9999<br>FAX : 99-9999-9999 | お届け先(Address) :<br>Hanako Fujitsu<br>XXXX East Arques Avenue.<br>Sunnyvale, CA.<br>00000, U.S.A<br>TEL : +1 XXX XXX XXX<br>FAX : +1 XXX XXX XXX |
|---|---|
| 郵便物番号(Mail Item No.) :  (211) | 備考(Remarks) :  (213) |
| 送達手段(Shipped Per.) :  (212) | |
| 支払い条件(Terms of Payment) | |

| 内容品の記載<br>(Description) | 重量<br>(Net Weight) | 数量<br>(Quantity) | 単価<br>(Unit Price)<br>通貨(Currency)<br>JPY | 合計額<br>(Total Amount) |
|---|---|---|---|---|
| Video camera | 6.0Kg | 1 | 150,000 | 150,000 |
| Camera Accessary | 1.0Kg | 1 | 15,000 | 15,000 |
| Magazine | 2.0Kg | 5 | 400 | 2,000 |
| Contact lens | 0.5Kg | 2 | 3,000 | 6,000 |
| Notebook | 0.2Kg | 5 | 300 | 1,500 |
| Ballpoint pen | 0.3Kg | 2 | 500 | 1,000 |
| 総合計(Total) | 10.0Kg | | | 175,500 |

郵便物の個数(Number of pieces) : 1
総重量(Gross weight) Kg : 10.0Kg  署名(Signature)
原産国(Country of Origin) : JAPAN     (214)

```
<root>
    <input item A type="text" x="100" y="600" width="500" height="150" font="Mincho" fontsize="10" index="1" displayliteral="Mail Item No."/>
    <input item B type="text" x="100" y="800" width="500" height="150" font="Mincho" fontsize="10" index="2" displayliteral="Shipped Per."/>
    <input item C type="text" x="400" y="650" width="500" height="400" font="Mincho" fontsize="10" index="3" displayliteral="Remarks"/>
    <input item D type="handwriting" x="450" y="1300" width="500" height="500" index="4" displayliteral="Signature"/>
</root>
```

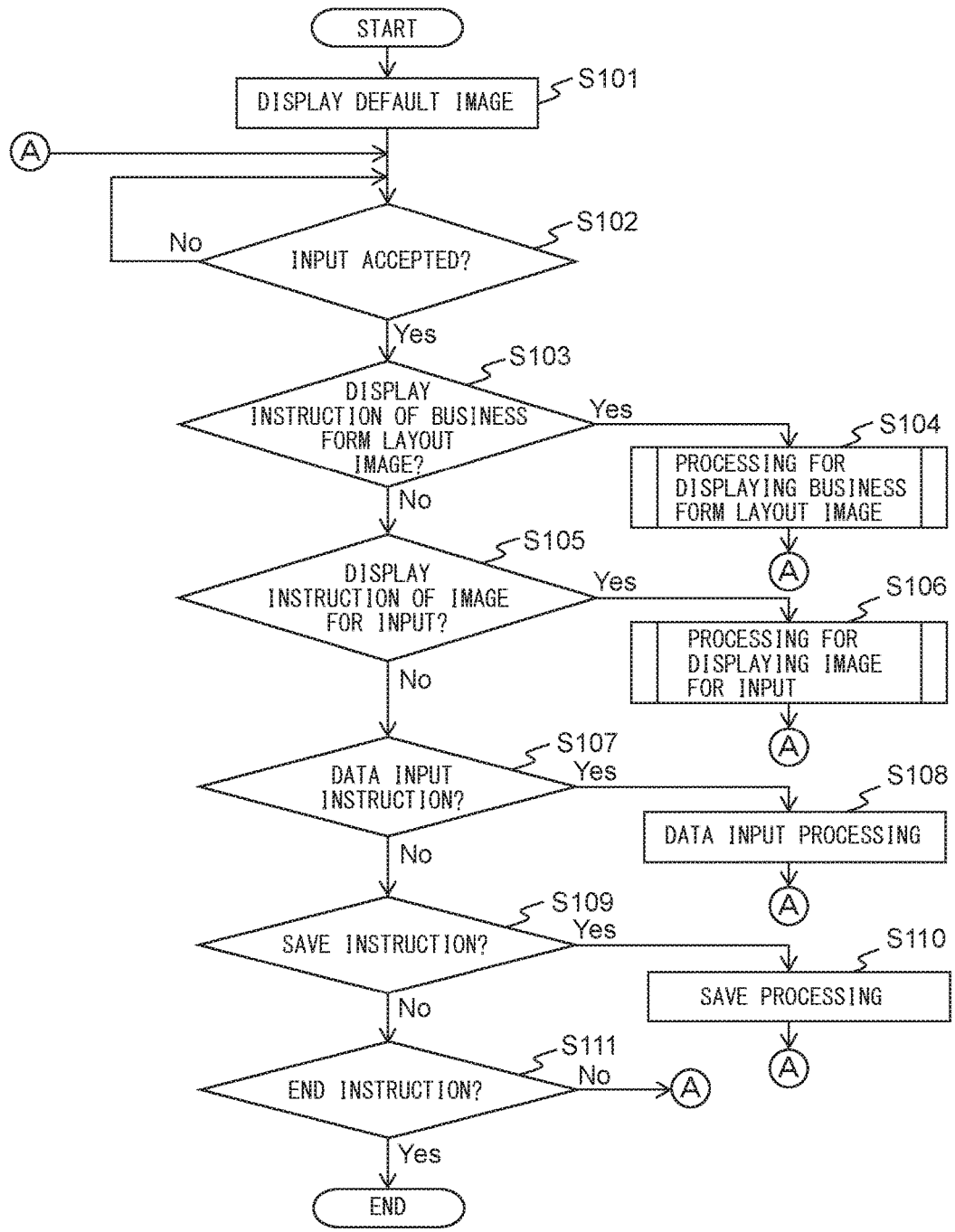

FIG. 10

CHECK LIST

| | DATE OF ENTRY | 2013/04/01 |
|---|---|---|
| ○○○○ | △△△ | □□□ |

| No. | CHECK ITEM | OK | No. | CHECK ITEM | OK |
|---|---|---|---|---|---|
| 1 | ITEM 1 | | 7 | ITEM 7 | |
| 2 | ITEM 2 | | 8 | ITEM 8 | |
| 3 | ITEM 3 | | 9 | ITEM 9 | |
| 4 | ITEM 4 | | 10 | ITEM 10 | |
| 5 | ITEM 5 | | 11 | ITEM 11 | |
| 6 | ITEM 6 | | | | |
| 12 | ITEM 12 | | 23 | ITEM 23 | |
| 13 | ITEM 13 | | 24 | ITEM 24 | |
| 14 | ITEM 14 | | 25 | ITEM 25 | |
| 15 | ITEM 15 | | 26 | ITEM 26 | |
| 16 | ITEM 16 | | 27 | ITEM 27 | |
| 17 | ITEM 17 | | 28 | ITEM 28 | |
| 18 | ITEM 18 | | 29 | ITEM 29 | |
| 19 | ITEM 19 | | | | |
| 20 | ITEM 20 | | | | |
| 21 | ITEM 21 | | | | |
| 22 | ITEM 22 | | | | |

| No. | MAINTENANCE POSITION | MAINTENANCE METHOD/REMARKS |
|---|---|---|
| 1 | | — 1001 |
| 2 | | — 1002 |
| 3 | | — 1003 |

CUSTOMER CONFIRMATION — 1011
CUSTOMER CONFIRMATION — 1012

```
<root>
    <customer input field>
        <input item A type="text" x="80" y="1300" width="500" height="100" font="Mincho" fontsize="10" index="1" displayliteral="Date of entry"/>
        <input item B type="text" x="450" y="1300" width="500" height="100" font="Mincho" fontsize="10" index="2" displayliteral="Name"/>
    </customer input field>
    <contact person input field>
        <input item C type="text" x="100" y="500" width="800" height="250" font="Mincho" fontsize="10" index="3" displayliteral="Remark 1"/>
        <input item D type="text" x="100" y="750" width="800" height="250" font="Mincho" fontsize="10" index="4" displayliteral="Remark 2"/>
        <input item E type="text" x="100" y="1000" width="800" height="250" font="Mincho" fontsize="10" index="5" displayliteral="Remark 3"/>
    </contact person input field>
</root>
```

FIG. 12A

| No. | CHECK ITEM | OK | No. | |
|---|---|---|---|---|
| 1 | ITEM 1 | | 7 | IT |
| 2 | ITEM 2 | | 8 | IT |
| 3 | ITEM 3 | | 9 | IT |
| 4 | ITEM 4 | | 10 | IT |
| 5 | ITEM 5 | | 11 | IT |
| 6 | ITEM 6 | | | |
| 12 | ITEM 12 | | 23 | IT |
| 13 | ITEM 13 | | 24 | IT |
| 14 | ITEM 14 | | 25 | IT |
| 15 | ITEM 15 | | 26 | IT |
| 16 | ITEM 16 | | 27 | IT |
| 17 | ITEM 17 | | 28 | IT |
| 18 | ITEM 18 | | 29 | IT |
| 19 | ITEM 19 | | | |
| 20 | ITEM 20 | | | |
| 21 | ITEM 21 | | | |
| 22 | ITEM 22 | | | |

Header buttons: CUSTOMER INPUT (1202), CONTACT PERSON INPUT (1203), INPUT ALL (1204), frame 1200, region 1201

CHECK

○○○○  DATE OF ENTRY △△△

No. MAINTENANCE POSITION    MAINTE

SAVE   END

FIG. 15

CHECK LIST

| ○○○○ | DATE OF ENTRY | 2013/04/01 |
|---|---|---|
| | △△△ | □□□ |

| No. | CHECK ITEM | OK | No. | CHECK ITEM | OK |
|---|---|---|---|---|---|
| 1 | ITEM 1 | | 7 | ITEM 7 | |
| 2 | ITEM 2 | | 8 | ITEM 8 | |
| 3 | ITEM 3 | | 9 | ITEM 9 | |
| 4 | ITEM 4 | | 10 | ITEM 10 | |
| 5 | ITEM 5 | | 11 | ITEM 11 | |
| 6 | ITEM 6 | | | | |
| 12 | ITEM 12 | | 23 | ITEM 23 | |
| 13 | ITEM 13 | | 24 | ITEM 24 | |
| 14 | ITEM 14 | | 25 | ITEM 25 | |
| 15 | ITEM 15 | | 26 | ITEM 26 | |
| 16 | ITEM 16 | | 27 | ITEM 27 | |
| 17 | ITEM 17 | | 28 | ITEM 28 | |
| 18 | ITEM 18 | | 29 | ITEM 29 | |
| 19 | ITEM 19 | | | | |
| 20 | ITEM 20 | | | | |
| 21 | ITEM 21 | | | | |
| 22 | ITEM 22 | | | | |

| No. | MAINTENANCE POSITION | MAINTENANCE METHOD/REMARKS |
|---|---|---|
| 1 | | |
| 2 | | |
| 3 | | |

| CUSTOMER CONFIRMATION | CUSTOMER CONFIRMATION |
|---|---|
| | |

FIG. 16B

BUSINESS FORM LAYOUT IMAGE — 1610

CHECK ITEM:
- ITEM 1 ☐  — 1611
- ITEM 2 ☐
- ITEM 3 ☐
- ITEM 4 ☐
- ITEM 5 ☐
- ITEM 6 ☐
- ITEM 7 ☐
- ...

[SAVE] [END]

INFORMATION PROCESSING DEVICE, DISPLAY METHOD AND CONTROL PROGRAM

CROSS-REFERENCE TO RELATED APPLICATION(S)

This application is a National Phase Patent Application and claims the priority of International Application Number PCT/JP2014/057876, filed on Mar. 20, 2014, the entire contents of which are incorporated herein by reference.

TECHNICAL FIELD

The present invention relates to an information processing device, a display method, and a control program, and in particular, to an information processing device, a display method, and a control program for displaying an image that represents a business form.

BACKGROUND

Portable terminals that can be carried around, such as tablet personal computers (PC), are becoming more common. Such portable terminals are used in specific businesses, in particular, in businesses using business forms. A business form includes items to be input by a worker. When such a business form is handled using a portable terminal, business form data that is generally utilized is data where item input fields to be input by a worker are placed at item entry positions of an image that represents a business form. Using such business form data, the worker can easily understand where to input each item to be entered, which facilitates smooth operation of the business.

A content generation and distribution system that generates contents in which texts, images, and the like are placed in a particular layout and displays the contents on a portable terminal is known (refer to Patent Document 1).

There has also been known a screen generation system that changes a screen decoration definition that describes the sizes, colors, designs, and the like of a variety of icons, screens, and the like depending on whether the terminal type of the user terminal is a portable telephone, a smartphone, or a tablet PC (refer to Patent Document 2).

CITATION LIST

Patent Literature

Patent Document 1: Japanese Laid-open Patent Publication No. 2010-288243
Patent Document 2: Japanese Laid-open Patent Publication No. 2012-247927

SUMMARY

Technical Problem

In the above-described business form data, since the item input fields are placed at fixed positions on an image that represents a business form, unlike automatically relocatable documents such as HyperText Markup Language (HTML) documents, the image that represents the business form and the item input fields are not relocated in accordance with the screen size of a portable terminal. As such, when large sized business form data is displayed in full on a small screen of a portable terminal, the image representing the business form and the item input fields are displayed in small scale, which makes it difficult to browse each information on the image and select each item input field. In such a case, a worker needs to zoom in around the information that the worker wants to browse or the item input field that the worker wants to select and further scroll the screen so that the information or item input field is appropriately displayed, which disadvantageous usability for the worker.

An objective of the information processing device, display method, and control program is to improve usability for a user when the user utilizes a business form using the information processing device.

Solution Problem

The information processing device according to an embodiment includes an operation module for receiving an input by a user, a display module, and a display control module for, according to an input by a user using the operation module, switching and displaying, on the display module, a first display image where item input fields are placed respectively at a plurality of item entry positions in an image that represents a business form and a second display image where the item input fields and information that indicates items to be input in the item input fields are placed alongside without displaying the image that represents the business form.

The display method of an information processing device including an operation module and a display module according to an embodiment includes receiving an input by a user using the operation module, and according to an input by a user using the operation module, switching and displaying, on the display module, a first display image where item input fields are placed respectively at a plurality of item entry positions in an image that represents a business form and a second display image where the item input fields and information that indicates items to be input in the item input fields are placed alongside without displaying the image that represents the business form.

The control program according to an embodiment causes the information processing device including an operation module and a display module to execute a process, the process includes receiving an input by a user using the operation module, according to an input by the user using the operation module, switching and displaying, on the display module, a first display image where item input fields are placed respectively at a plurality of item entry positions in an image that represents a business form and a second display image where the item input fields and information that indicates items to be input in the item input fields are placed alongside without displaying the image that represents the business form.

Advantageous Effects of Invention

According to an embodiment of the present invention, the information processing device switches, in accordance with user input, between an image where item input fields are placed at item entry positions on an image that represents a business form and an image where item input fields and information that indicates items to be input in the item input fields are placed alongside without displaying the image that represents the business form. Therefore, the information processing device can improve usability for a user when the user utilizes a business form.

The object and advantages of the invention will be realized and attained by means of the elements and combinations, in particular, pointed out in the claims. It is to be understood that both the foregoing general description and the following detailed description are exemplary and explanatory, and are not restrictive of the invention, as claimed.

BRIEF DESCRIPTION OF DRAWINGS

FIG. 2 is a schematic view depicting an example of a business form image;

FIG. 3 is a schematic view depicting an example of input information definition data;

FIG. 6 is a flowchart depicting an example of the operation of input data entry processing;

FIG. 10 is a schematic view depicting an example of a business form image in another example;

FIG. 11 is a schematic view depicting an example of input information definition data in the other example;

FIG. 12A is a schematic view depicting an example of a business form layout image in the other example;

FIG. 15 is a schematic view depicting an example of a business form image in still another example;

FIG. 16B is a schematic view depicting an example of an image for input in the still other example.

DESCRIPTION OF THE EMBODIMENTS

Hereinafter, an information processing device, display method, and control program according to an embodiment, will be described with reference to the drawings. However, note that the technical scope of the invention is not limited to these embodiments and extends to the inventions described in the claims and their equivalents.

Figure 1:
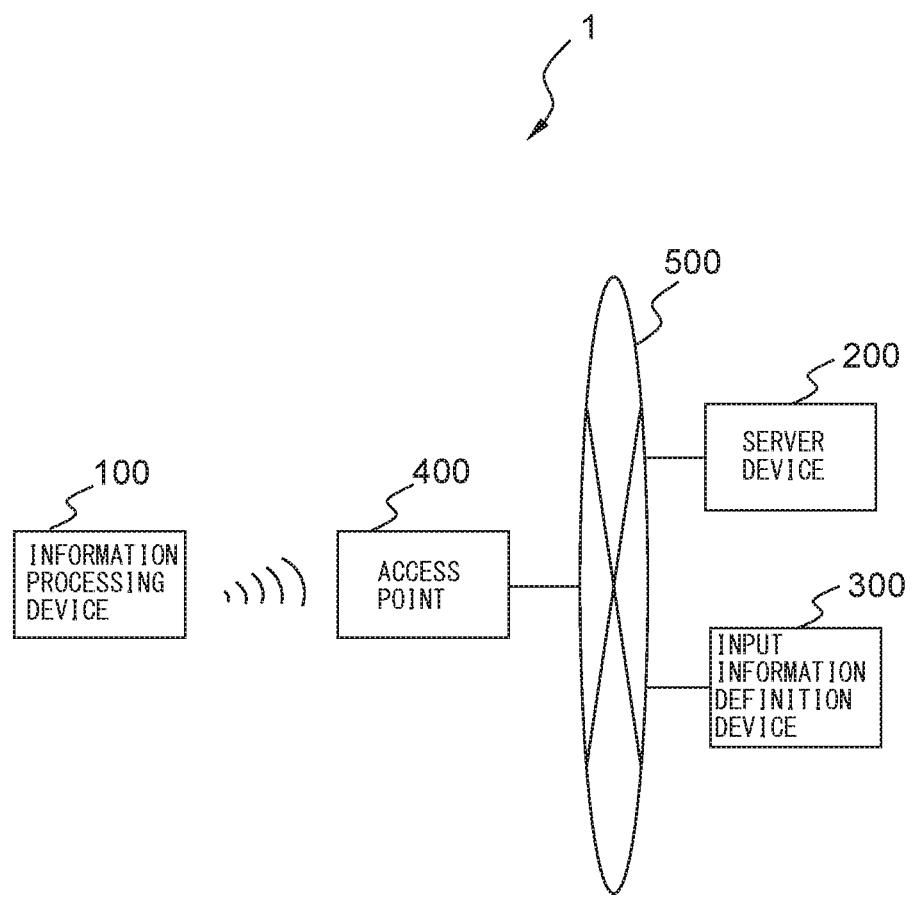
FIG. 1 is a diagram depicting an information processing system 1 according to an embodiment.

FIG. 1 is a diagram depicting an information processing system 1 according to an embodiment.

The information processing system 1 has an information processing device 100, a server device 200, and an input information definition device 300.

The information processing device 100 has a wireless local area network (LAN) communication function to connect to a wireless LAN access point 400. The access point 400 wirelessly communicates with the information processing device 100 in accordance with a wireless LAN communication method within a service area. Further, the access point 400 is connected to a wired network 500. The wired network 500 is connected to the server device 200, the input information definition device 300, and the like through a wired LAN, such as Ethernet (registered trademark). The information processing device 100 can communicate with the server device 200, and the server device 200 can communicate with the input information definition device 300.

It should be noted that, instead of a wireless LAN communication function, the information processing device 100 may have other wireless communication function, such as a portable telephone communication function, or a wired communication function, such as a wired LAN, to connect with the wired network 500 and communicate with the server device 200 in accordance with the communication method.

The server device 200 is a server that manages business form data that the information processing device 100 uses. The business form is a document including items to be entered by a worker. The server device 200 stores image data that represents a business form that is registered by the administrator (hereinafter, referred to as the business form image).

FIG. 2 is a schematic view depicting an example of a business form image.

As shown in FIG. 2, a plurality of item entry frames 211 to 214 to be entered by a worker are placed in the business form image 210.

In response to a request from the input information definition device 300, the server device 200 transmits a business form image to the input information definition device 300 and stores input information definition data of the business form image registered by the input information definition device 300 in association with the business form image. The input information definition data is data that defines a content to be input, a position, type, and the like for receiving an input, for each item to be entered in each item entry frame 211 to 214 placed in the business form image 210.

FIG. 3 is a schematic view depicting an example of input information definition data.

As depicted in FIG. 3, the input information definition data 310 stores, for each item, an input type, a position of an item input field for receiving information to be input by a worker, a size, a text font, an identification number, an input content, and the like of the item input field in association with one another. The input type (type) is a type of input for an item, which is specified by text input (text), handwriting input (handwriting), or the like. The position of an item input field is specified by a horizontal position (x), a vertical position (y) and the like in the image, at which the item input field is placed. The size of an item input field is specified by a width (width), a height (height) and the like. The text font is a font of a text to be input when the input type is text, which is specified by a font (font), a font size (fontsize), and the like. The identification number (index) is a number that is uniquely assigned to an item input field placed in an image. The input content (displayliteral) is supplementary information indicating an item to be input in an item input field. It should be noted that the supplementary information is not limited to a text, yet, may be an image or the like. In such a case, a file name or the like of a file that represents an image is specified by the input content.

The server device 200, in response to a request from the information processing device 100, transmits the business form image, the input information definition data, and the latest input data that has been input in the item input field to the information processing device 100. Hereinafter, the business form image, input information definition data, and input data may be collectively referred to as the business form data. It should be noted that the initial value of input data, i.e., the input data before being input by the information processing device 100 is blank. When receiving business form data that includes input data that has been newly input in the item input field from the information processing device 100, the server device 200 stores the received business form data. Thereafter, when acquisition of business form data is requested from the information processing device 100, the server device 200 transmits the business form data that includes the latest input data to the information processing device 100. Further, the server device 200 extracts the input data from the business form data and manages the input data. In response to a request from a device that utilizes the input data, the extracted input data is transmitted to the device, where the input data is utilized.

The input information definition device 300 is a device for the operator to create input information definition data. In accordance with the operation by the operator, the input information definition device 300 requests acquisition of a business form image from the server device 200 and displays the acquired business form image. Further, the input information definition device 300, in accordance with operation by the operator, generates input information definition data and transmits and registers the generated input information definition data, together with the business form image, to the server device 200. As such, the operator can easily add, delete, or change the item input fields by changing the information definition data.

Figure 4:
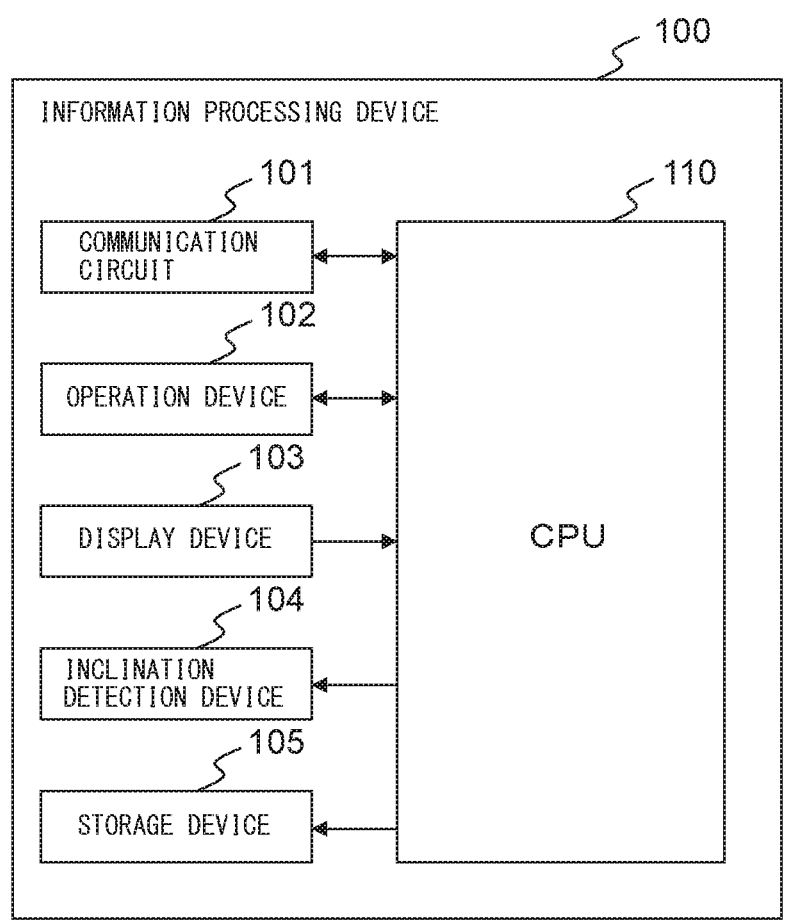
FIG. 4 is a diagram depicting an example of a schematic structure of an information processing device 100.

FIG. 4 is a diagram depicting an example of a schematic structure of the information processing device 100.

The information processing device 100 is an information processing device, such as a tablet PC, a multi-functional portable telephone (smartphone), a portable digital assistant, or a laptop PC, and used by a worker as a user. The information processing device 100 has a communication circuit 101, an operation device 102, a display device 103, an inclination detection device 104, a storage device 105, and a Central Processing Unit (CPU) 110. The following will describe each component of the information processing device 100 in detail.

The communication circuit 101 has a communication interface circuit including an antenna that mainly has a reception frequency band at 2.4 GHz band, 5 GHz band, or the like. The communication circuit 101 wirelessly communicates with the access point 400 according to the wireless communication method of IEEE (The Institute of Electrical and Electronics Engineers, Inc.) 802.11 standard. Then, the communication circuit 101 supplies data received from the server device 200 to the CPU 110 via the access point 400. Further, the communication circuit 101 transmits data supplied from the CPU 110 to the server device 200 via the access point 400. It should be noted that the communication circuit 101 may be of any kind as long as it is capable of communicating with the server device 200. For example, the communication circuit 101 may communicate with the server device 200 via a base station device, not depicted in the drawings, according to a portable telephone communication method or communicate with the server device 200 according to a wired LAN communication method.

The operation device 102 is an example of the operation module, which has: a touch panel style input device; input equipment, such as a keyboard and a mouse; and an interface circuit that acquires a signal from the input equipment. The operation device 102 receives user input and outputs a signal according to the user input to the CPU 110.

The display device 103 is an example of the display module, which has: a display that is configured by liquid crystal, organic electroluminescence (EL), or the like; and an interface circuit that outputs image data or various information to the display. The display device 103 is connected to the CPU 110 and displays the image data that is output from the CPU 110 on a display. It should be noted that the operation device 102 and the display device 103 may be integrally configured using a touch panel display.

The inclination detection device 104 has an acceleration sensor to detect, in response to a request from the CPU 110, acceleration applied to the information processing device 100 in three axis directions, detect an inclination of the information processing device 100 using the detected acceleration, and output the inclination to the CPU 110. The acceleration sensor can be, for example, a three-axis acceleration sensor of piezoresistance type that utilizes a piezoresistance effect or a three-axis acceleration sensor of capacitance type that utilizes a change in capacitance.

The storage device 105 is an example of the storage module. The storage device 105 has: a memory device, such as a RAM (Random Access Memory) and a ROM (Read Only Memory); a fixed disc device, such as a hard-disk; or a portable storage device, such as a flexible disc and an optical disc. Further, the storage device 105 stores a computer program, a database, a table, and the like that are used for various processing of the information processing device 100. The computer program may be installed on the storage device 105 from a computer-readable, non-transitory medium such as a compact disk read only memory (CD-ROM), a digital versatile disk read only memory (DVD-ROM), or the like by using a well-known setup program or the like.

Further, the storage device 105 stores the business form data acquired from the server device 200. The storage device 105 further stores the longer side resolution and the shorter side resolution of the display screen of the display device 103. It should be noted that, in the present embodiment, the resolution refers to the number of pixels displayed on the display screen.

The CPU 110 is connected to and controls the communication circuit 101, the operation device 102, the display device 103, the inclination detection device 104 and the storage device 105. The CPU 110 controls: transmission and reception of data with the server device 200 via the communication circuit 101; input of the operation device 102; display of the display device 103; the inclination detection device 104; the storage device 105, and like.

Further, in accordance with operation by a worker using the operation device 102, the CPU 110 requests acquisition of the business form data from the server device 200 and stores the acquired business form data in the storage device 105. Further, in accordance with operation by the worker using the operation device 102, the CPU 110 transmits the business form data including newly input data to the server device 200.

Figure 5:
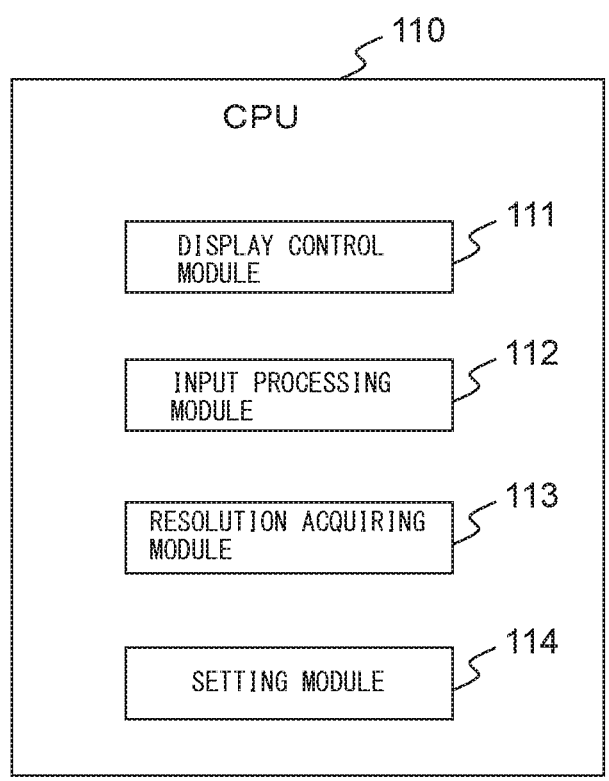
FIG. 5 is a diagram depicting an example of a schematic structure of a CPU 110.

FIG. 5 is a diagram depicting an example of a schematic structure of the CPU 110. As depicted in FIG. 5, the CPU 110 has a display control module 111, an input processing module 112, a resolution acquiring module 113, and a setting module 114. Each module is a functional module implemented by software that operates on the processor. It should be noted that such modules may be respectively configured by an independent integrated circuit, a microprocessor, a firmware, or the like.

FIG. 6 is a flowchart depicting an example of the operation of input data entry processing by the information processing device 100.

The following will illustrate an example of the operation of the whole processing of the information processing device 100 with reference to the flowchart depicted in FIG. 6. The operation flow as will be described below is performed primarily by the CPU 110 jointly with the components of the information processing device 100 according to a program prestored in the storage device 105. It should be noted that the flowchart depicted in FIG. 6 is performed when an operator instructed editing of business form data using the operation device 102.

Initially, the display control module 111 displays a default image that represents information relating to the business form data on the display device 103 (step S101). The default image is either a business form layout image or an image for input, and the default image is preset to either of the images.

Figure 7A:
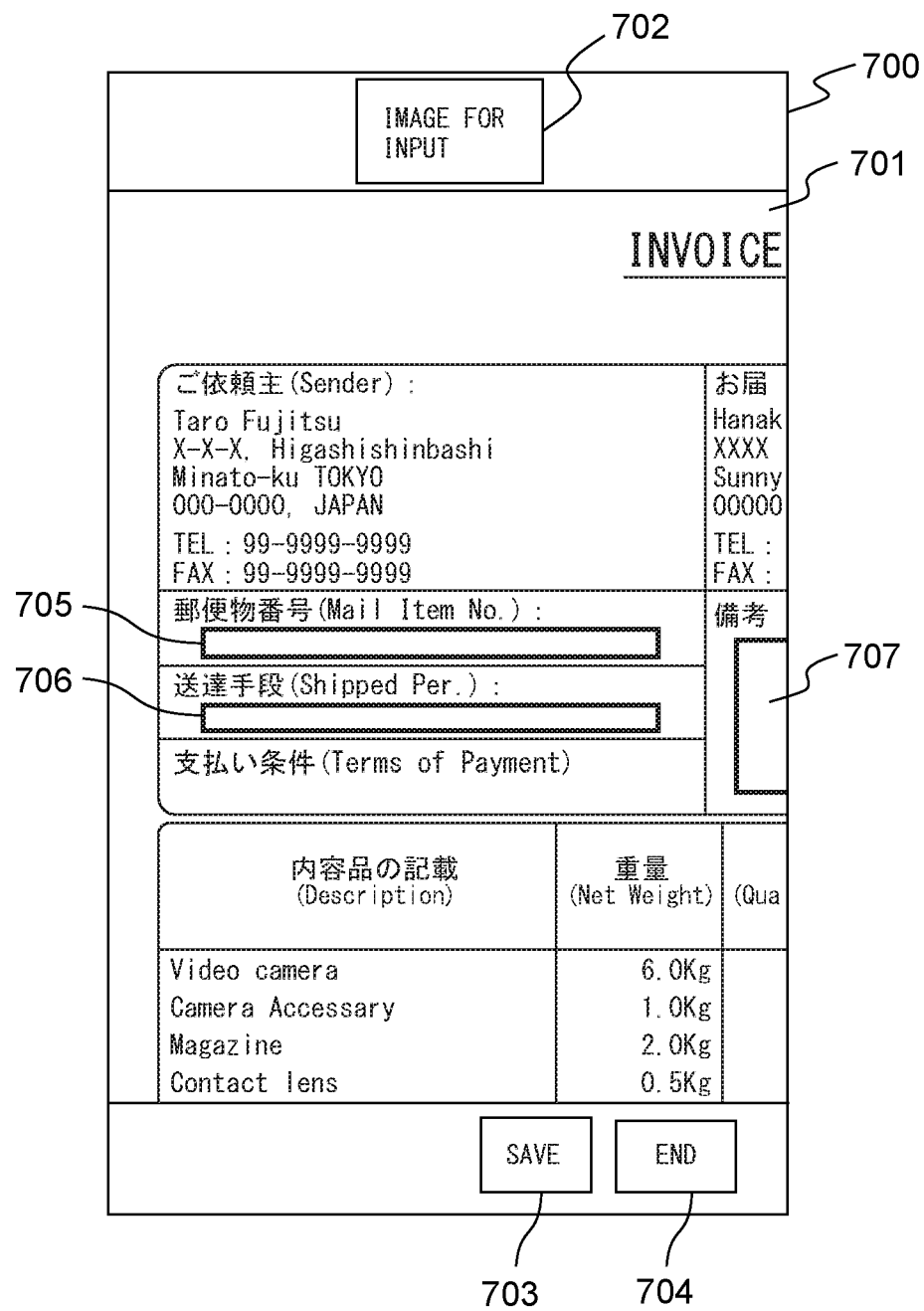
FIG. 7A is a schematic view depicting an example of a business form layout image.

FIG. 7A is a schematic view depicting an example of the business form layout image.

FIG. 7A depicts a display screen 700 of the display device 103 that displays a business form layout image 701. As depicted in FIG. 7A, the business form layout image 701 is a display image where the item input fields are placed at positions of the item entry frames 211 to 214 in the business form image 210 depicted in FIG. 2 based on the input information definition data 310 depicted in FIG. 3. The item input fields are objects that allow inputting of information when selected (tapped) by a worker. The item input fields display the latest information input by the worker. Further, the display image 700 displays a button 702 for switching the business form layout image 701 to an image for input, a save button 703, and an end button 704.

In an example depicted in FIG. 7A, only the upper left portion of the business form image 210 is displayed, where only item input fields 705 to 707 corresponding to the item entry frames 211 to 213 are displayed. As such, in the example depicted in FIG. 7A, an item input field corresponding to the item entry frame 214 is not displayed and the item input field 707 is not displayed in full. Thus, to specify the item input field 707 or the item input field corresponding to the item entry frame 214, the worker needs to scroll the business form image 210 using the operation device 102.

Figure 7B:
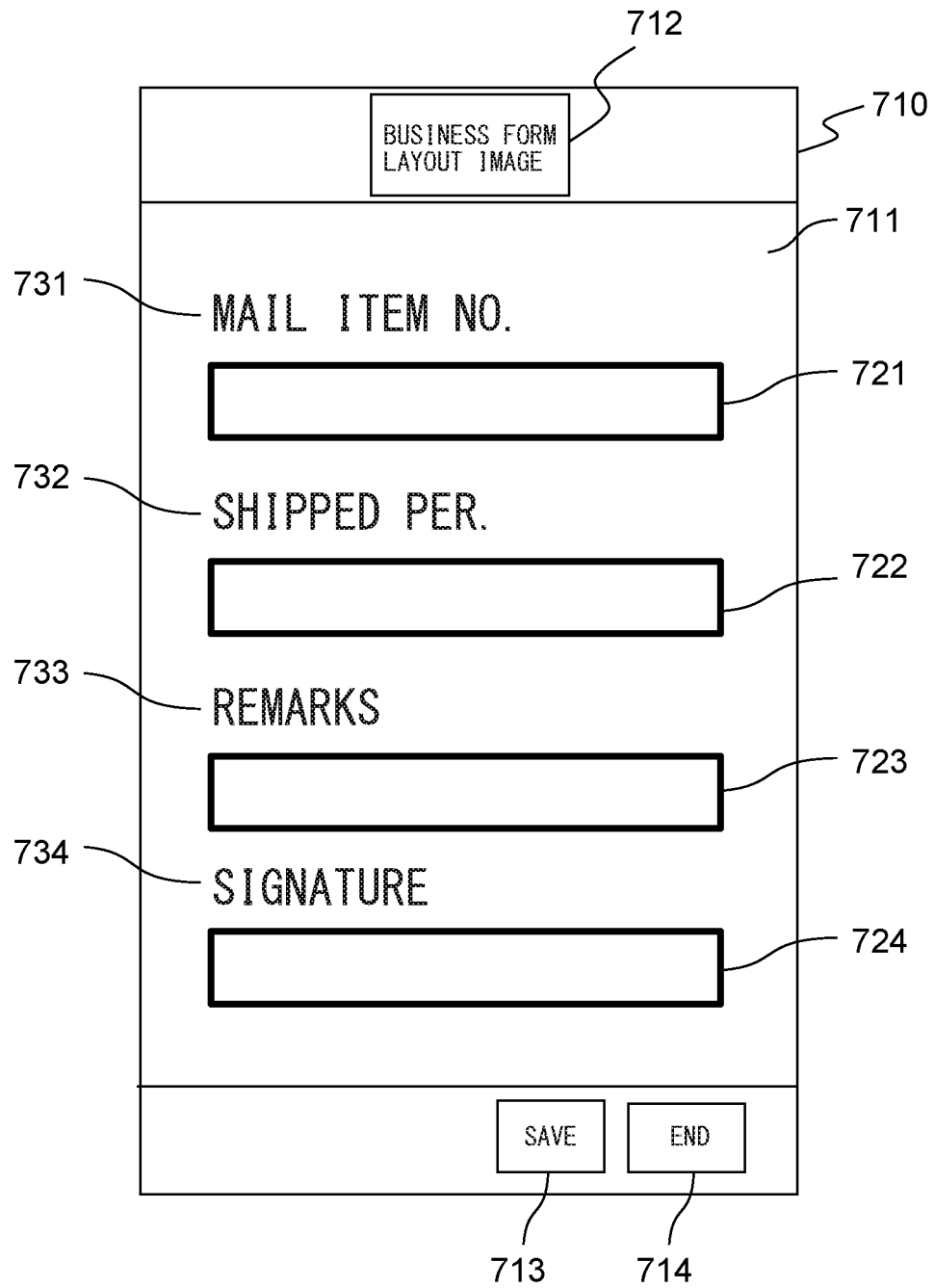
FIG. 7B is a schematic view depicting an example of an image for input.

FIG. 7B is a schematic view depicting an example of the image for input.

FIG. 7B depicts a display screen 710 of the display device 103 that displays an image for input 711. As depicted in FIG. 7B, the image for input 711 is a display image where item input fields 721 to 724 and supplementary information 731 to 734 corresponding to the item input fields 721 to 724 are placed alongside based on the input information definition data 310, without displaying the business form image 210. The item input fields in the image for input 711 are objects that allow inputting of information when selected by a worker in the same way as the item input fields in the business form layout image 701. The item input fields display the latest information input by the worker. Further, the display image 710 displays a button 712 for switching the image for input 711 to a business form layout image 701, a save button 713, and an end button 714.

The image for input 711 simultaneously displays all item input fields 721 to 724 within a display screen 710, and the worker can easily select each item input field.

The display control module 111 generates a business form layout image or an image for input as a default image based on the input information definition data and the like and displays the image on the display device 103. The details of the method of generating the business form layout image and the image for input will be described later herein.

Next, the display control module 111 stands by until the operation device 102 receives an input from the worker (step S102).

Next, when the operation device 102 receives an input from the worker, the display control module 111 determines whether the received input is a display instruction of a business form layout image or not (step S103). For example, when the button 712 for switching to a business form layout image depicted in FIG. 7B is pressed (tapped), the display control module 111 determines that the received input is a display instruction of the business form layout image.

When the received input is a display instruction of the business form layout image, the display control module 111 carries out processing for displaying the business form layout image (step S104) and returns the processing to step S102. In the processing for displaying the business form layout image, the display control module 111 switches the image displayed on the display device 103 from the image for input to the business form layout image. The details of the processing for displaying a business form layout image will be described later herein.

Whereas, when the received input is not a display instruction of the business form layout image, the display control module 111 determines whether the received input is a display instruction of the image for input (step S105). For example, when the button 702 for switching to the image for input, as depicted in FIG. 7A, is pressed, the display control module 111 determines that the received input is a display instruction of the image for input.

When the received input is a display instruction of the image for input, the display control module 111 carries out the processing for displaying the image for input (step S106), and returns the processing to step S102. In the processing for displaying the image for input, the display control module 111 switches the image displayed on the display device 103 from the business form layout image to the image for input. The details of the processing for displaying an image for input will be described later herein.

Whereas, when the received input is not a display instruction of the image for input, the display control module 111 determines whether or not the received input is a data input instruction (step S107). For example, when an item input field in the business form layout image or the image for input is specified by pressing (tapping) thereon, the display control module 111 determines that the received input is a data input instruction.

When the received input is a data input instruction, the input processing module 112 receives specific information, such as characters and numbers, input by the worker using the operation device 102. The input processing module 112 temporarily stores the received information in association with the specified item input field in the storage device 105, as well as, displays the received information in the item input field specified on the currently displayed image (step S108), and returns the processing to step S102.

Whereas, when the received input is not a data input instruction, the display control module 111 determines whether or not the received input is a save instruction (step S109). For example, when the save button is pressed, the display control module 111 determines that the received input is a save instruction.

When the received input is a save instruction, the input processing module 112 stores each set of input information and the item input field, which has been temporarily stored at step S108, in the storage device 105 as input data (step S110) and returns the processing to step S102.

Whereas, when the received input is not a data input instruction, the display control module 111 determines whether or not the received input is an end instruction (step S111). For example, when the end button is pressed, the display control module 111 determines that the received input is an end instruction.

When the received input is not an end instruction, the display control module 111 returns the processing to step S102. When the received input is an end instruction, the display control module 111 ends the series of steps.

As such, in accordance with an input by a user using the operation device 102, the display control module 111 switches between the business form layout image and the image for input and displays the image on the display device 103. As a worker can switch the display images so as to display a business form layout image when checking the whole business form and to display an image for input when inputting each item, the worker can perform tasks while viewing an appropriate image.

Figure 8:
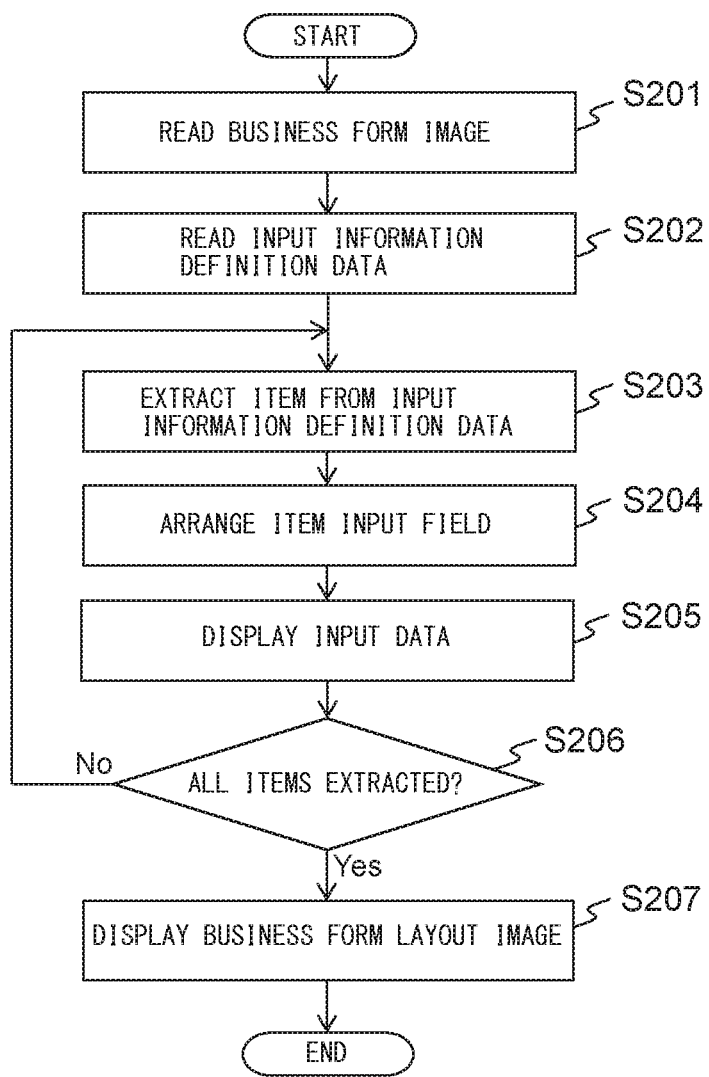
FIG. 8 is a flowchart depicting an example of the operation of processing for displaying a business form layout image.

FIG. 8 is a flowchart depicting an example of the operation of processing for displaying a business form layout image.

The operation flow depicted in FIG. 8 is carried out at step S104 of the flowchart depicted in FIG. 6.

The display control module 111 initially reads out a business form image included in the business form data from the storage device 105 (step S201).

Next, the display control module 111 reads out the input information definition data included in the business form data from the storage device 105 (step S202).

Next, the display control module 111 extracts an item with the smallest identification number from among the unprocessed items of the read out input information definition data (step S203).

Next, the display control module 111 places the item input field of the extracted item on the business form image (step S204). The display control module 111 identifies, for the extracted item, an input type, an input content, and the size and placement position of the item input field from the input information definition data, and places the item input field in the business form image, in accordance with the input type, the input content, and the size and placement position of the item input field so identified.

Next, the display control module 111 determines whether or not the input data corresponding to the item input field of the extracted item is stored in the storage device 105 and, if such data is stored, displays the corresponding input data in the item input field (step S205).

Next, the display control module 111 determines whether or not processing has completed for all of the items included in the input information definition data (step S206).

When processing has not completed for all of the items included in the input information definition data, the display control module 111 returns the processing to step S203 and repeats the processing of steps S203 to S205. Whereas, when processing has completed for all of the items included in the input information definition data, the display control module 111 displays an image where the item input fields are placed in a business form image as a business form layout image on the display device 103 (step S207), and ends the series of steps.

Figure 9:
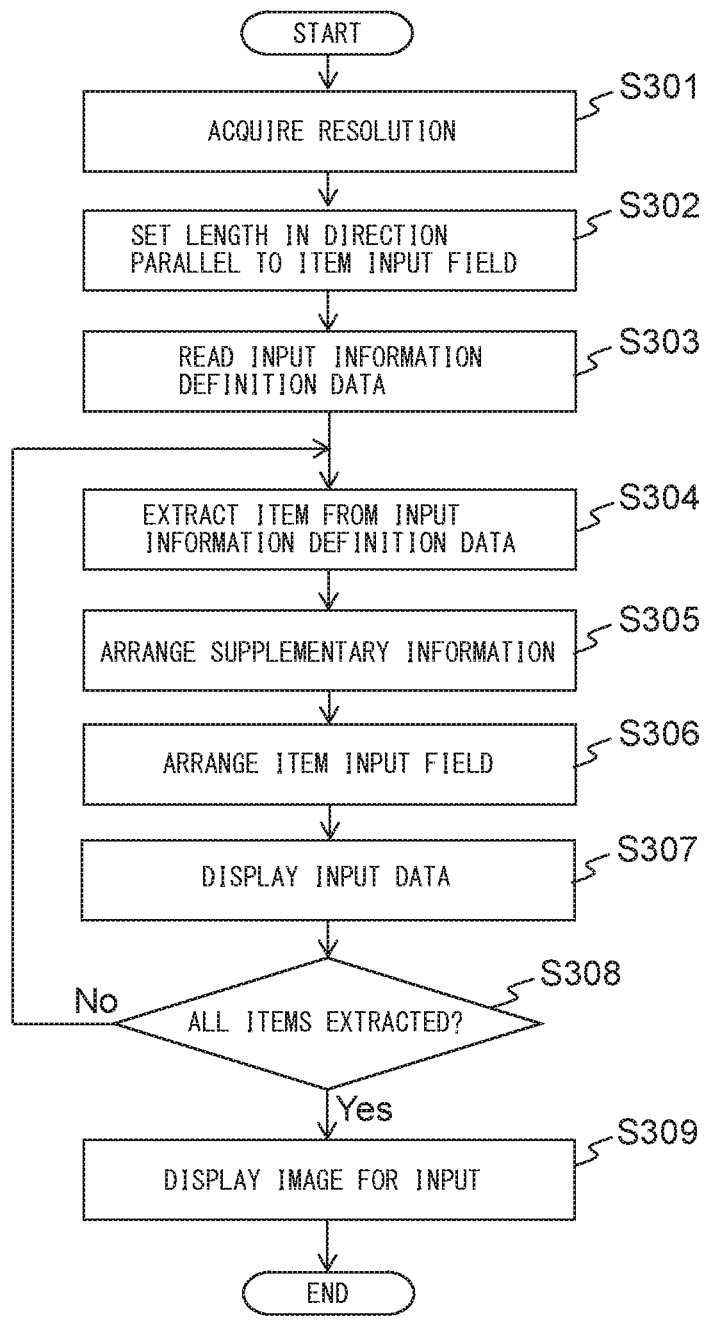
FIG. 9 is a flowchart depicting an example of the operation of processing for displaying an image for input.

FIG. 9 is a flowchart depicting an example of the operation of processing for displaying an image for input.

The operation flow depicted in FIG. 9 is carried out at step S106 of the flowchart depicted in FIG. 6.

The resolution acquiring module 113 initially reads and acquires the longer side resolution and shorter side resolution of the display screen of the display device 103 from the storage device 105 (step S301).

Next, the setting module 114 sets the length in a parallel direction to the item input fields of an image for input in accordance with the resolution acquired by the resolution acquiring module 113 (step S302).

The setting module 114 determines whether the longer side or shorter side of the display screen is the vertical direction based on the inclination of the information processing device 100, which is output by the inclination detection device 104. When the longer side of the display screen is the vertical direction, the setting module 114 places the item input fields in parallel to the shorter side of the display screen as depicted in FIG. 7B, while, when the shorter side of the display screen is the vertical direction, the setting module 114 places the item input fields in parallel to the longer side of the display screen.

When the item input fields are placed in parallel to the shorter side of the display screen, the setting module 114 sets the scale factor of the size of the item input fields so that the item input field of the largest width in the input information definition data is fit within the shorter side of the display screen. Likewise, when the item input fields are placed in parallel to the longer side of the display screen, the setting module 114 sets the scale factor of the size of the item input fields so that the item input field of the largest width in the input information definition data is fit within the longer side of the display screen. As such, a worker can browse all of the item input fields in the image for input by scrolling the image for input in an orthogonal direction to the item input fields of the image for input.

The display control module 111 changes the sizes of the item input fields to be displayed on the image for input while maintaining the ratio between the width and height of the item input fields by multiplying the respective width and height of the item input fields by the scale factor that is set by the setting module 114.

It should be noted that the display control module 111 may arrange the item input fields in a horizontal direction, instead of a vertical direction. In such a case, the setting module 114 sets the scale factor of the size of the item input fields so that the item input field of the largest height in the input information definition data is fit within the vertical direction of the display screen. In this case, a worker can browse all of the item input fields in the image for input by scrolling the image for input in a direction parallel to the item input fields of the image for input (i.e. in a horizontal direction).

Next, the display control module 111 reads out the input information definition data included in the business form data from the storage device 105 (step S303).

Next, the display control module 111 extracts an item with the smallest identification number from among the unprocessed items of the input information definition data (step S304).

Next, the display control module 111 places supplementary information of the extracted item in a solid color image (step S305). When supplementary information and item input fields are already placed in the solid color image, the display control module 111 places new supplementary information below the supplementary information and item input fields that have been already placed.

Next, the display control module 111 places the item input field of the extracted item alongside the corresponding supplementary information (for example, below the supplementary information) (step S306). The display control module 111 identifies an input type, an input content, and the size of the item input field of the extracted item from the input information definition data and places the item input field, in accordance with the input type, the input content, and the size of the item input field so identified, alongside the supplementary information.

Next, the display control module 111 determines whether or not the input data corresponding to the item input field of the extracted item is stored in the storage device 105, and, if the extracted item is stored, displays the corresponding input data in the item input field (step S307).

Next, the display control module 111 determines whether or not processing has completed for all of the items included in the input information definition data (step S308).

When processing has not completed for all of the items included in the input information definition data, the display control module 111 returns the processing to step S304 and repeats the processing of steps S304 to S307. Whereas, when processing has completed for all of the items included in the input information definition data, the display control module 111 displays an image where supplementary information and item input fields are placed as an image for input on the display device 103 (step S309), and ends the series of steps.

It should be noted that the display control module 111 may place item input fields in the order as placed in the input information definition data, instead of placing the item input fields in the ascending order of the identification numbers, in the image for input. In such a case, at step S304, the display control module 111 extracts items in the order from the beginning of the input information definition data. Further, the display control module 111 may place the item input fields in the image for input in the order of the item input fields as placed in the business form layout image. In such a case, at step S304, the display control module 111 extracts items from the top downward in a vertical direction. It should be noted that, if there are a plurality of items at a vertically same position, the display control module 111 extracts items from the left to the right in a horizontal direction.

Further, the operation for switching the displayed images is not limited to pressing of a button for switching to a business form layout image or a button for switching to an image for input. For example, the display control module 111 may switch between the business form layout image and the image for input to be displayed on the display device 103 based on the inclination of the information processing device 100 detected by the inclination detection device 104.

When the shorter side of the display screen is the vertical direction, the display control module 111 displays the business form layout image on the display device 103, while, when the longer side of the display screen is the vertical direction, the display control module 111 displays the image for input on the display device 103. As such, a worker can easily switch display images by inclining the information processing device 100, which can improve usability for the user. In particular, when displaying a laterally long business form, the whole business form is displayed when the display screen is placed sideways while only the item input fields are displayed when the display screen is placed in a portrait orientation, thereby enabling to automatically display an image that is appropriate for the vertical and horizontal sizes of the display screen.

It should be noted that, the display control module 111 may display the business form layout image on the display device 103 when the longer side of the display screen is the vertical direction, and display an image for input on the display device 103 when the shorter side of the display screen is the vertical direction. This case also improves usability for the user, in particular, in displaying a longitudinally long business form. An image that is appropriate for the longer side size and shorter side size of the display screen can be automatically displayed.

As described above, the information processing device 100 operates in accordance with the flowcharts depicted in FIGS. 6, 8, and 9, and switches and displays a business form layout image and an image for input in accordance with an input by a user. A user can check the whole business form by displaying the business form layout image and easily and appropriately select a desired item input field by displaying the image for input without performing operation such as zooming in. Therefore, the information processing device 100 can improve usability for a user when the user is utilizing a business form.

The following describes another example of the information processing system 1.

FIG. 10 is a schematic view depicting an example of a business form image, from which a business form layout image and an image for input are generated.

The business form image 1000 as depicted in FIG. 10 places item entry frames 1001 to 1003 for items to be entered by a worker and item entry frames 1011 to 1012 for items to be entered by a customer.

FIG. 11 is a schematic view depicting an example of input information definition data in this example.

In the input information definition data 1100 as depicted in FIG. 11, items are categorized into a plurality of groups. To each group belong individual item input fields that are placed in the business form layout image. In the example depicted in FIG. 11, input items C to E corresponding to item entry frames 1001 to 1003 for items to be entered by a worker belong to a contact person input field group and input items A to B corresponding to item entry frames 1011 to 1012 for items to be entered by a customer belong to a customer input field group. Further, the name of each group is stored in the input information definition data 1100.

FIG. 12A is a schematic view depicting an example of a business form layout image that is generated for the business form image 1000.

The display screen 1200 depicted in FIG. 12A displays a business form layout image 1201 corresponding to the business form image 1000. The display screen 1200 further displays a button 1202 for switching the business form layout image 1201 to an image for input that displays a customer input field group. The display screen 1200 further displays a button 1203 for switching a business form layout image 1201 to an image for input that displays a contact person input field group. The display screen 1200 further displays a button 1204 for switching a business form layout image 1201 to an image for input that displays all groups.

Figure 12B:
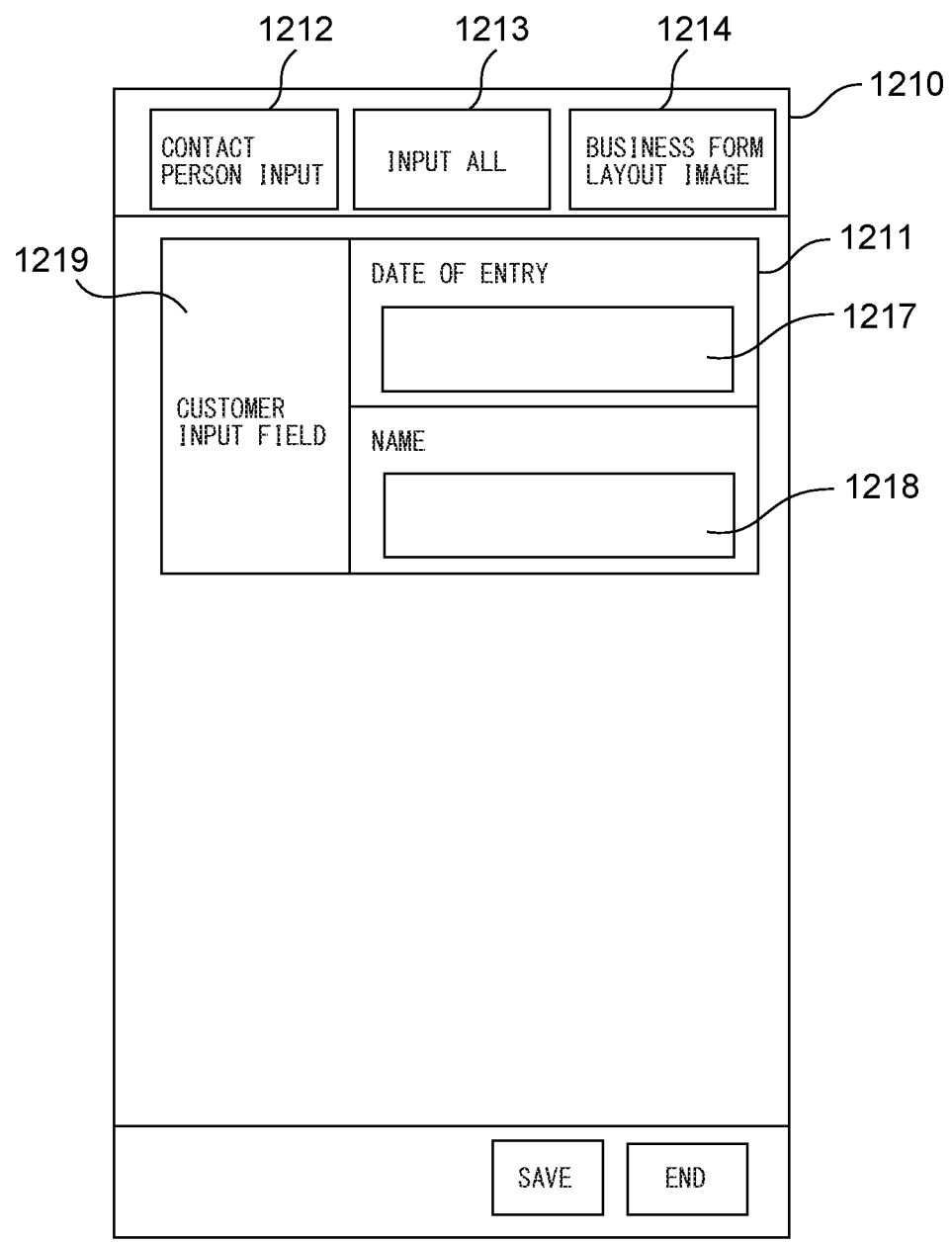
FIG. 12B is a schematic view depicting an example of an image for input in the other example.

FIG. 12B is a schematic view depicting an example of an image for input that displays a customer input field group.

The display screen 1210 depicted in FIG. 12B displays an image for input 1211 that displays a customer input field group. In the image for input 1211, item input fields 1217, 1218, and a group display field 1219 for displaying a group name, to which the item input fields 1217, 1218 belong, are placed. The display screen 1210 further displays a button 1212 for switching the image for input 1211 to an image for input that displays a contact person input field group. The display screen 1210 further displays a button 1213 for switching the image for input 1211 to an image for input that displays all groups. The display screen 1210 further displays a button 1214 for switching the image for input 1211 to a business form layout image 1201.

Figure 12C:
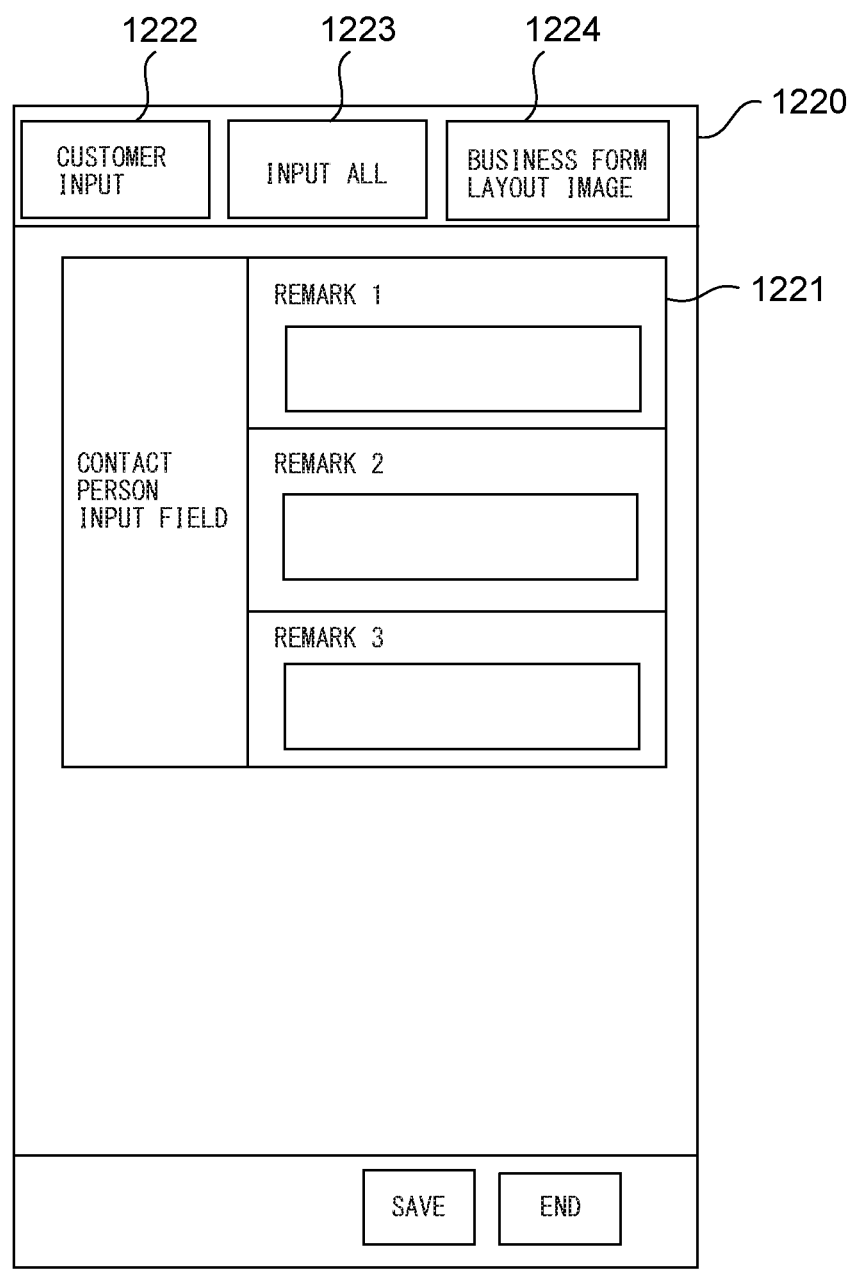
FIG. 12C is a schematic view depicting an example of an image for input in the other example.

FIG. 12C is a schematic view depicting an example of an image for input that displays a customer input field group.

The display screen 1220 depicted in FIG. 12C displays an image for input 1221 that displays a contact person input field group. The display screen 1220 further displays a button 1222 for switching the image for input 1221 to an image for input 1211 that displays a customer input field group. The display screen 1220 further displays a button 1223 for switching the image for input 1221 to an image for input that displays all groups. The display screen 1220 further displays a button 1224 for switching the image for input 1221 to a business form layout image 1201.

Figure 12D:
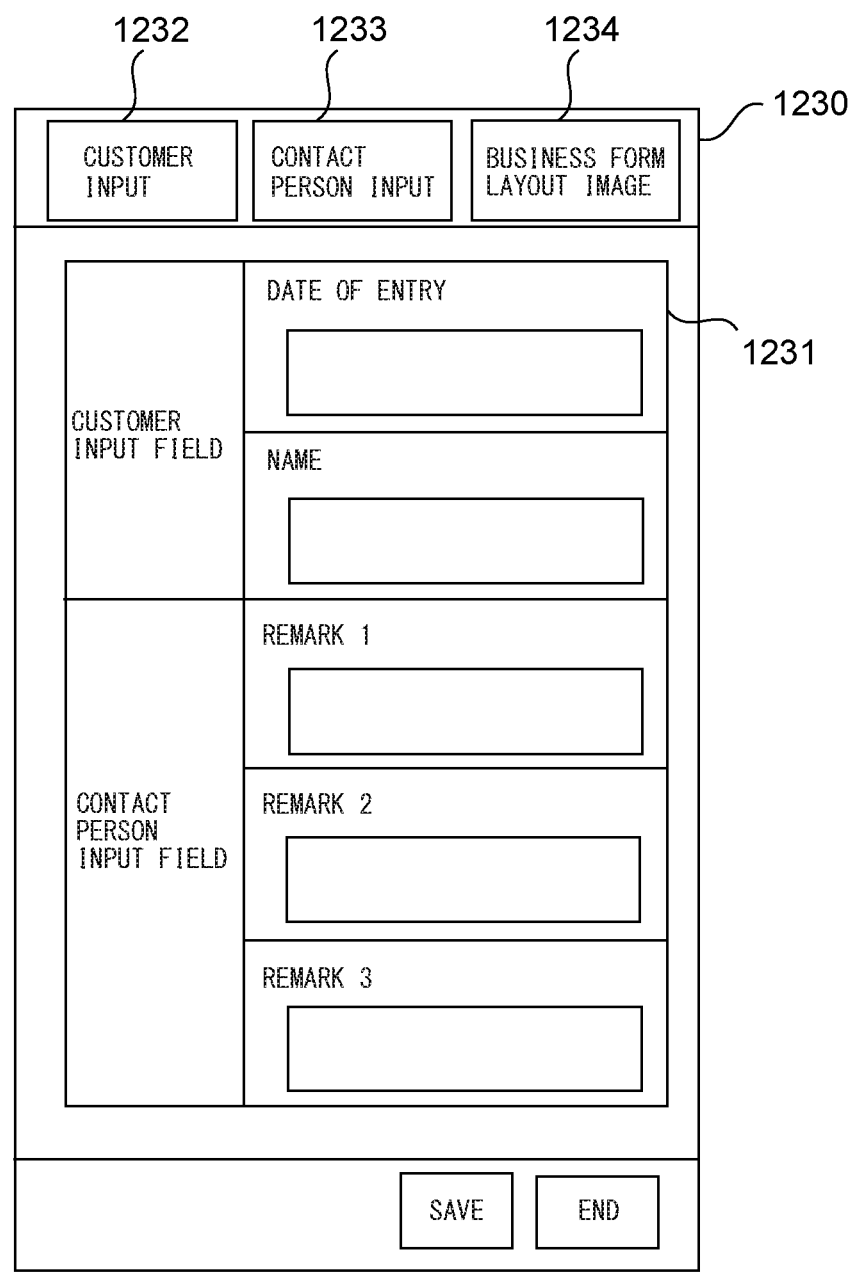
FIG. 12D is a schematic view depicting an example of an image for input in the other example.

FIG. 12D is a schematic view depicting an example of an image for input that displays all groups.

The display screen 1230 depicted in FIG. 12D displays an image for input 1231 that displays all groups. The display screen 1230 further displays a button 1232 for switching the image for input 1231 to an image for input 1211 that displays a customer input field group. The display screen 1230 further displays a button 1233 for switching the image for input 1231 to an image for input 1221 that displays a contact person input field group. The display screen 1230 further displays a button 1234 for switching the image for input 1231 to a business form layout image 1201.

The operation of input data entry processing by the information processing device 100 in this example is the same as the operation depicted in the flowchart of FIG. 6. However, when a button for switching to an image for input as depicted in FIGS. 12A to 12D is pressed at step S105, the display control module 111 determines that the received input is a display instruction of an image for input. The display control module 111 identifies a group to be displayed in the image for input depending on which button is pressed.

Figure 13:
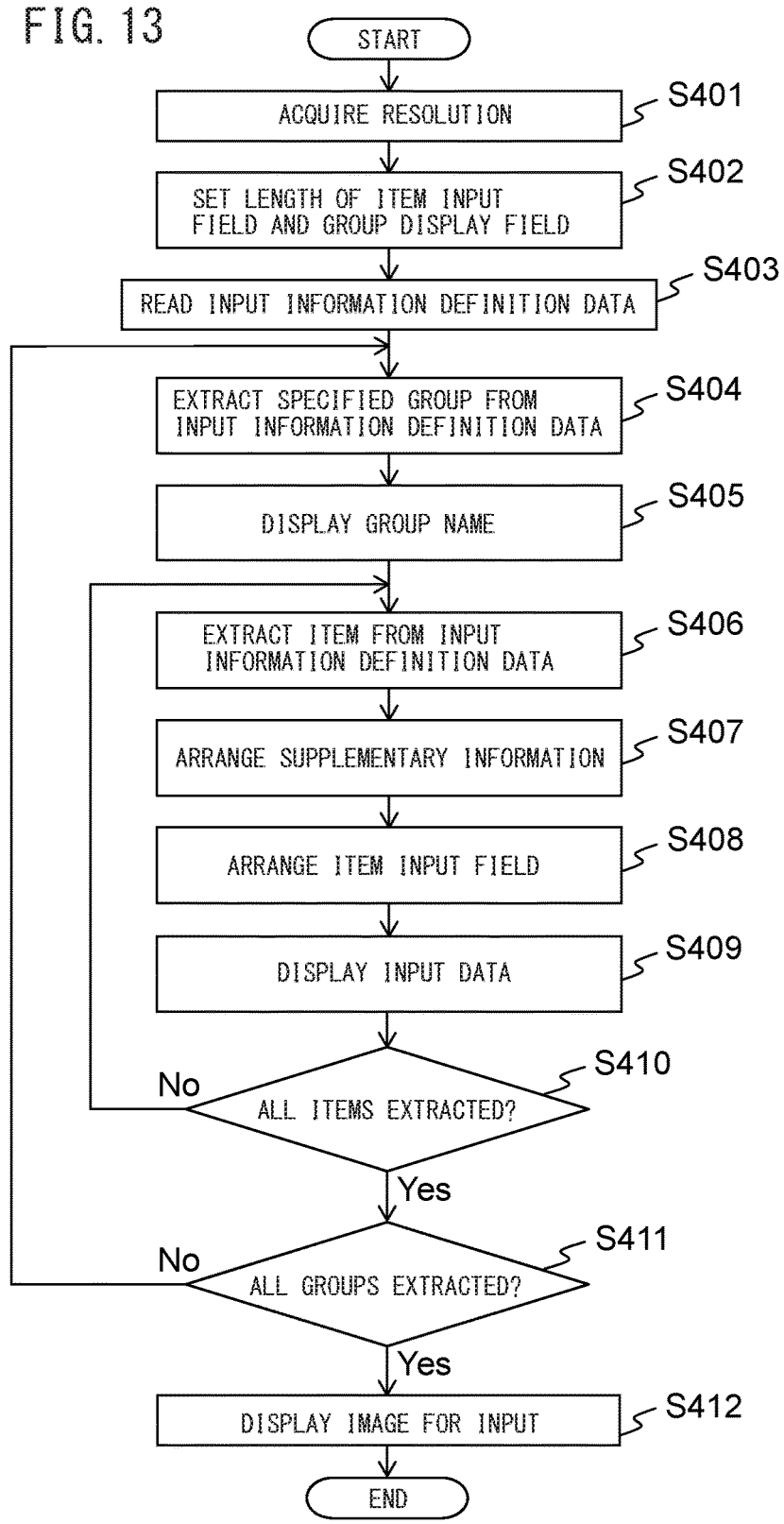
FIG. 13 is a flowchart depicting another example of the operation of processing for displaying an image for input.

FIG. 13 is a flowchart depicting an example of the operation of processing for displaying an image for input in this example.

This flowchart can be implemented by the information processing device 100 in replacement of the flowchart depicted in the above-described FIG. 9. Description of the processing of steps S401, S403 in the flowchart depicted in FIG. 13 will be omitted as it is respectively the same as the processing of steps S301, S303 in the flowchart depicted in FIG. 9. Thus, the following will describe the rest of the processing.

At step S402, the setting module 114 sets the length of the item input fields and the length of the group display fields in a direction parallel to the item input fields based on the resolution that the resolution acquiring module 113 acquired (step S402). The setting module 114 sets the length of the group display fields and the length of the item input fields based on a predefined ratio of the length of the item input fields with respect to the length of the group display fields in a direction parallel to the item input field. Then, in the same way as the processing of step S302, the setting module 114 sets the scale factor of the sizes of the item input fields so that the item input field of the largest width in the input information definition data can be fit in the length of the set item input fields.

At step S404, the display control module 111 identifies the group specified by the worker, based on the input received at step S102, and extracts one of the identified groups from the input information definition data (step S404).

Next, the display control module 111 displays the group name of the extracted group in the group display field (step S405).

Next, the display control module 111 extracts an item with the smallest identification number from among the unprocessed items in the extracted group (step S406).

The processing of steps S407 to S409 are respectively the same processing as steps S305 to S307 in the flowchart as depicted in FIG. 9. However, the display control module 111 places the supplementary information and item input field of the extracted item in a manner corresponding to a group name, to which the item belongs.

At step S410, the display control module 111 determines whether or not processing has completed for all of the items that belong to the extracted group (step S410).

When processing has not completed for all of the items that belong to the extracted group, the display control module 111 returns the processing to step S406 and repeats the processing of steps S406 to S409. Whereas, when processing has completed for all of the items that belong to the extracted group, the display control module 111 determines whether or not processing has completed for all of the groups specified at step S404 (step S411).

When processing has not completed for all of the specified groups, the display control module 111 returns the processing to step S404 and repeats the processing of steps S404 to S410. Whereas, when processing has completed for all of the specified groups, the display control module 111 displays an image where the group display fields, supplementary information, and item input fields are placed as an image for input on the display device 103 (step S412), then, ends the series of steps.

As such, the display control module 111 places, in an image for input, item input fields that belong to the groups specified by a user using the operation device 102 from among the item input fields that are placed in a business form layout image. By categorizing groups for users or work contents, the display control module 111 can display only items to be input by a user in an image for input. In this way, usability for users can be further improved, while users can be prevented from omissions of required input items, erroneous input to items that should not be input, and the like.

While this example describes groups at a single hierarchical level, there may be a plurality of hierarchical levels in the groups.

Figure 14A:
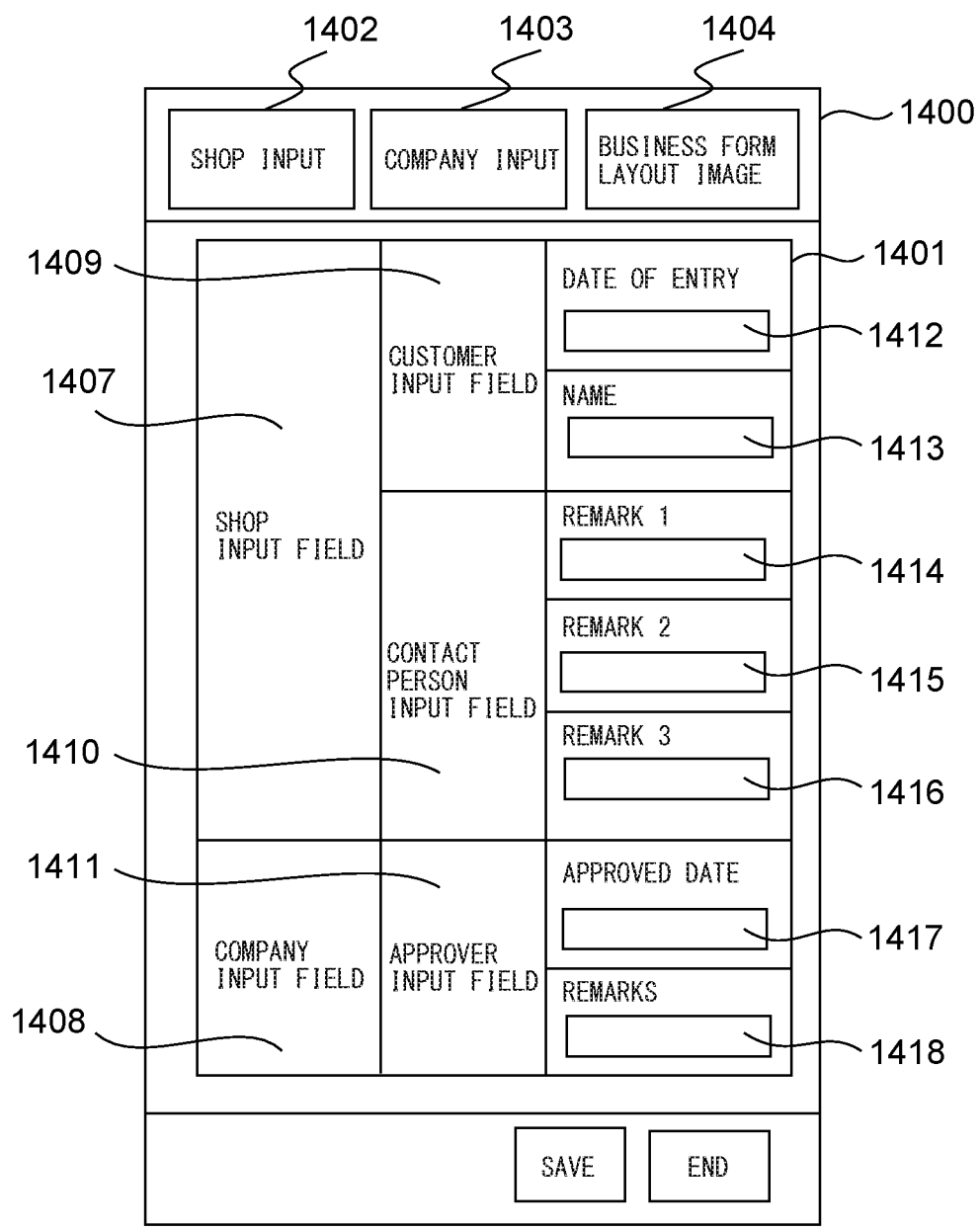
FIG. 14A is a schematic view depicting an example of an image for input in the other example.

FIG. 14A is a schematic view depicting an example of an image for input when there are a plurality of hierarchical levels in the groups.

The display screen 1400 depicted in FIG. 14A displays an image for input 1401 when there are a plurality of hierarchical levels in groups. The input information definition data, which is a source for the image for input 1401, includes a customer input field group, a contact person input field group, and an approver input field group. The customer input field group and the contact person input field group further belong to a shop input field group; the approver input field group further belongs to a company input field group. In this case, as depicted in FIG. 14A, in the image for input 1401 are placed group display fields 1407 and 1408 of the first hierarchical group, group display fields 1409 to 1411 of the second hierarchical group, and item input fields 1412 to 1418. The display screen 1400 further displays a button 1402 for switching the image for input 1401 to an image for input that displays the shop input field group. The display screen 1400 further displays a button 1403 for switching the image for input 1401 to an image for input that displays a company input field group. The display screen 1400 further displays a button 1404 for switching the image for input 1401 to a business form layout image.

It should be noted that the display control module 111 may switch the image for input to an image for input that displays the specified group not only when the button 1402 or 1403 is pressed but also when each group display field 1407 to 1411 is specified by double tapping or the like. In such a case, when the group display field 1407 or 1408 of the first hierarchical group is specified, the display control module 111 displays an image for input that displays a group that is one level down than the specified group (i.e., second hierarchical group). Whereas, when the group display field 1409, 1410, or 1411 of the second hierarchical group is specified, the display control module 111 displays an image for input that displays the specified group.

Figure 14B:
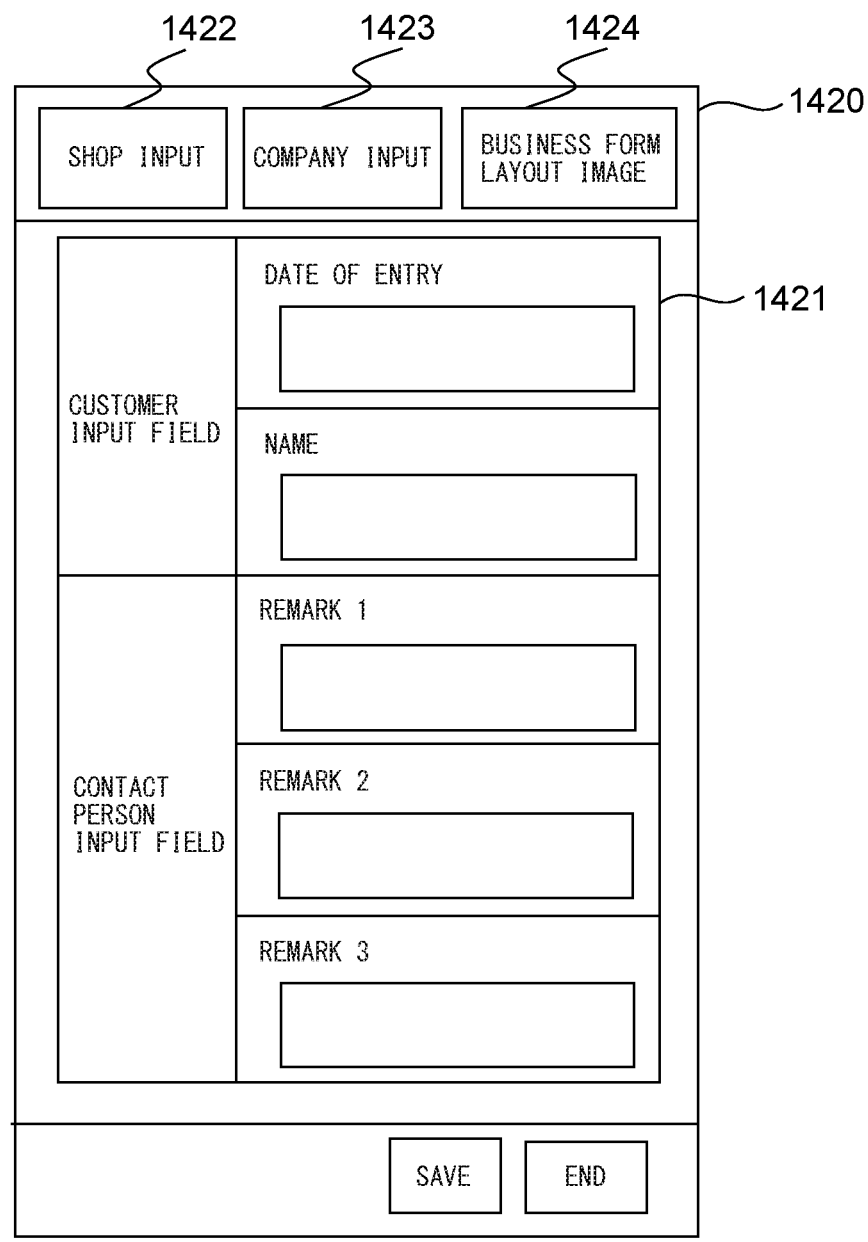
FIG. 14B is a schematic view depicting an example of an image for input in the other example.

FIG. 14B is a schematic view depicting an example of an image for input when the group display field 1407 is pressed.

As depicted in FIG. 14B, when the group display field 1407 is pressed, the display screen 1420 displays an image for input 1421. In this image for input 1421, the group display fields of a customer input field group and a contact person input field group, which belong to a shop input field group, and the item input fields that belong to the customer input field group and the item input fields that belong to the contact person input field group, are placed.

Figure 14C:
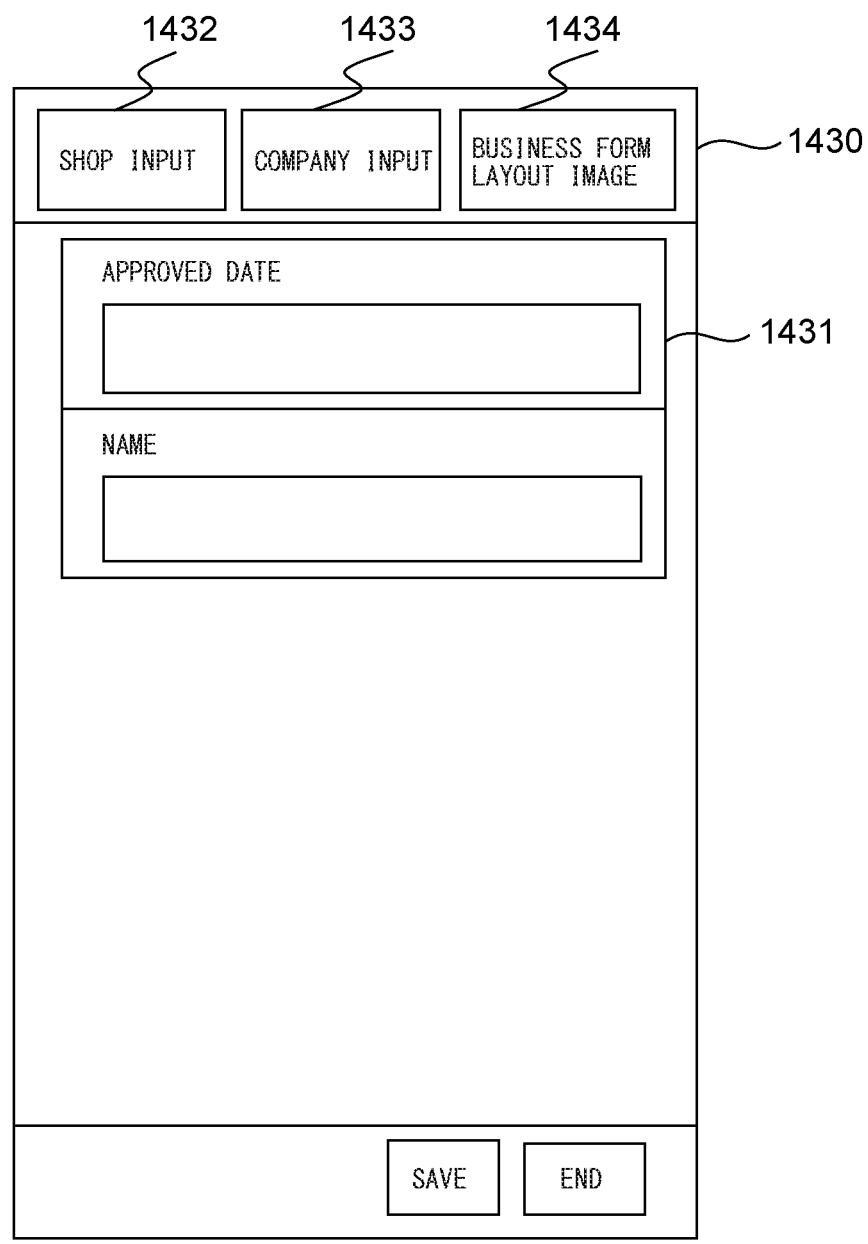
FIG. 14C is a schematic view depicting an example of an image for input in the other example.

FIG. 14C is a schematic view depicting an example of an image for input when the group display field 1411 is pressed.

As depicted in FIG. 14C, when the group display field 1411 is pressed, the display screen 1430 displays an image for input 1431. In this image for input 1431, the item input fields that belong to an approver input field group, is placed.

The display control module 111 may automatically change the item input fields placed in the image for input depending on the user who operates the information processing device 100. In such a case, the information processing device 100 stores in advance groups, to which the item input fields placed in the business form layout image belong, in association with login names as identification information of individual users in the storage device 105. Further, the CPU 100 stores the login name of a user that is input using the operation device 102, upon the user logging in, in the storage device 105. When a display instruction of an image for input is input, the display control module 111 reads the group that has been stored in association with the login name that was input by a user, from the storage device 105. The display control module 111 then places, in the image for input, item input fields that belong to the group from among the item input fields that are placed in a business form layout image.

In this way, when a user gives a display instruction of an image for input, only the items to be input by the user are automatically displayed. Thus, the user can perform operation without paying attention to which items to be input and which items not to be input, which further improves usability for the user.

The following describes still another example of the information processing system 1.

FIG. 15 depicts a business form image, from which a business form layout image and an image for input are generated, in this example.

In the business form image 1500 depicted in FIG. 15, an item entry frame 1511 for entering check results of a plurality of check items is placed in an upper area 1501, and an item entry frame 1512 for entering maintenance methods/remarks is placed in a lower area 1502.

In this example, input information definition data stores a group, to which item input fields placed in a business form layout image belong, in association with the position and size of an area in the business form layout image that includes the item input fields that belong to the group. In other words, a check item group, to which item input fields corresponding to the item entry frame 1511 belong, is stored in association with the upper area 1501. On the other hand, a maintenance group, to which item input fields corresponding to the item entry frame 1512 belong, is stored in association with the lower area 1502.

It should be noted that each group may be stored in a table and the like other than the input information definition data in association with the position and size of the corresponding area. Further, the CPU 110 may automatically group items of the same input type existing in the vicinity of one another based on the placement positions, sizes, and the like of the item input fields included in the input information definition data. The CPU 110 may further automatically associate each group to an area defined by a circumscribing rectangular that encompasses all of the item input fields that belong to the group.

Figure 16A:
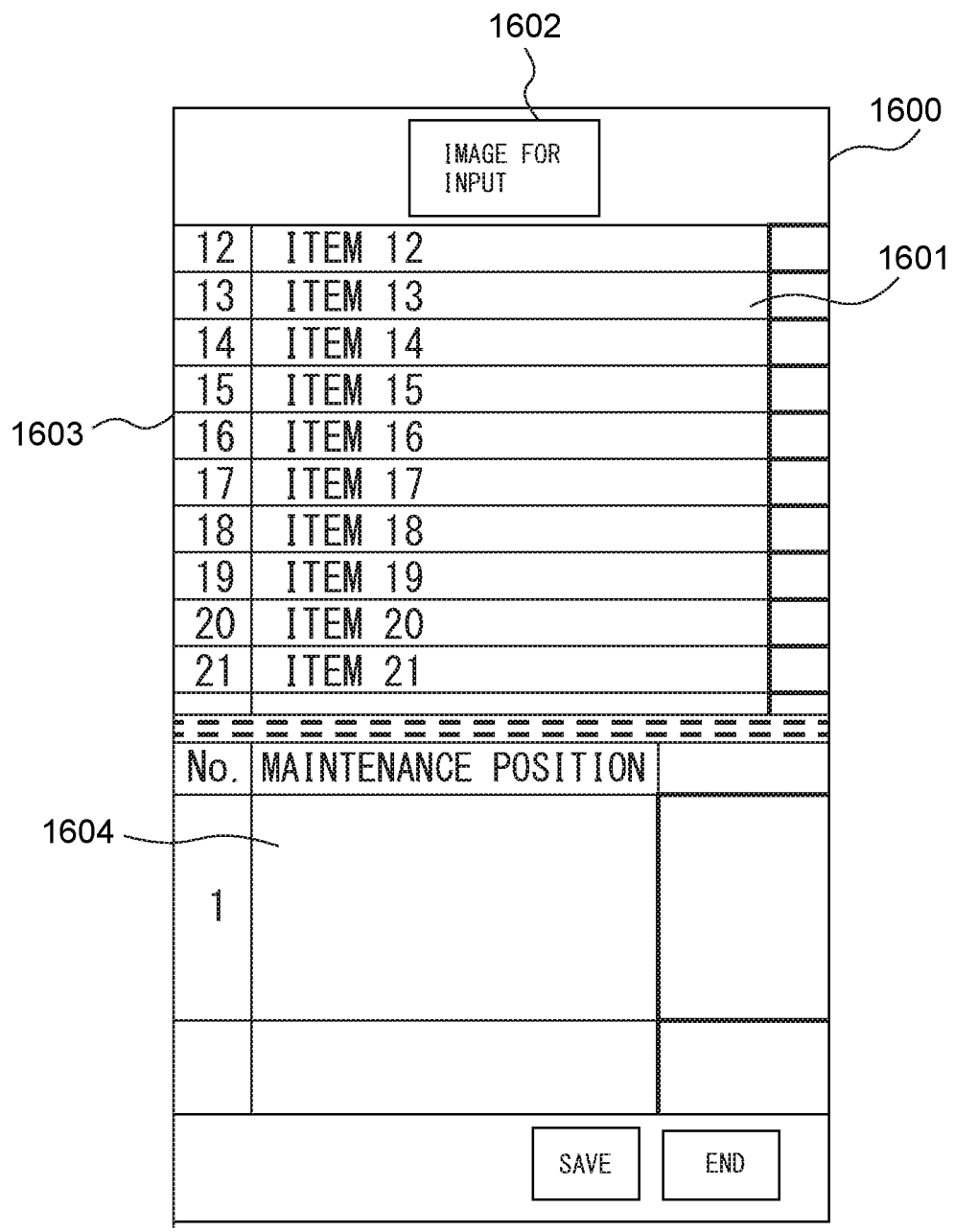
FIG. 16A is a schematic view depicting an example of a business form layout image in the still other example.

FIG. 16A is a schematic view depicting an example of a business form layout image that is generated with regard to a business form image 1500.

The display screen 1600 depicted in FIG. 16A displays a business form layout image 1601 corresponding to the business form image 1500. The display screen 1600 further displays a button 1602 for switching the business form layout image 1601 to an image for input. Further, when the upper area 1603 or the lower area 1604 in the business form layout image 1601 is specified by double tapping and the like, the display control module 111 switches to an image for input that displays a group corresponding to the specified area.

FIG. 16B is a schematic view depicting an example of an image for input when the upper area 1603 in the business form layout image 1601 is specified.

The display screen 1610 depicted in FIG. 16B displays an image for input 1611 that displays a check item group corresponding to the upper area 1603.

Figure 16C:
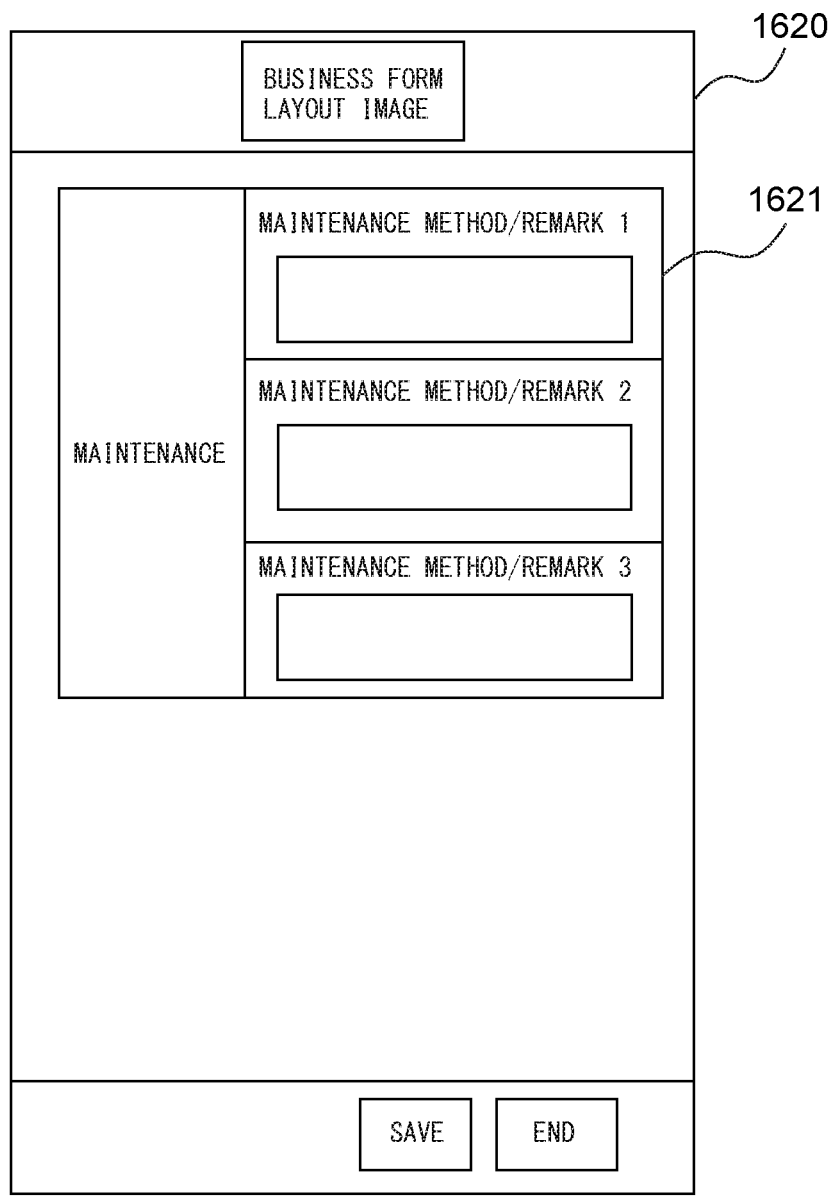
FIG. 16C is a schematic view depicting an example of an image for input in the still other example.

FIG. 16C is a schematic view depicting an example of an image for input when the lower area 1604 in the business form layout image 1601 is specified.

The display screen 1620 depicted in FIG. 16C displays an image for input 1621 that displays a maintenance group corresponding to the lower area 1604.

As such, the display control module 111 places, in the image for input, item input fields that belong to a group corresponding to an area in the business form layout image specified by a user using the operation device 102 from among the item input fields that are placed in the business form layout image. As a user can select a group of item input fields to be input by specifying an area in a business form layout image, selection of a group can be made intuitively, which further improves usability for the user.

It should be noted that the display control module 111 may place, in the image for input, item input fields positioned within a predetermined range from a position specified by a user using the operation device 102, from among the item input fields that are placed in a business form layout image. In such a case, the display control module 111 acquires a coordinate of a position in the business form layout image, which is pressed by a user using the operation device 102. The display control module 111, based on the placement positions of item input fields stored in the input information definition data, specifies the item input fields within a predetermined range from the acquired coordinate and generates an image for input, on which the specified item input fields are placed.

As a user specifies a specific area thereby selecting a plurality of item input fields in the vicinity of the specified area, the user can more intuitively select the item input fields to be displayed on the image for input, which further enhances usability for the user.

Alternatively, the display control module 111 may place, in the image for input, item input fields that belong to the same group as an item input field specified by a user using the operation device 102 from among the item input fields that are placed in a business form layout image. In such a case, when a user specifies a specific item input field with a method that is different from data input instructions (for example, double-tapping), the display control module 111 identifies item input fields that belong to the same group as the specified item input field based on the input information definition data. Then, the display control module 111 generates an image for input where the identified item input fields are placed.

Since a user can specify a specific item input field and obtain an image for input that displays a plurality of item input fields relating to the item input field, usability for the user can be further improved.

REFERENCE SIGNS LIST

100 Information Processing Device
101 Communication Circuit
102 Operation Device
103 Display Device
104 Inclination Detection Device
105 Storage Device
110 CPU
111 Display Control Module
112 Input Processing Module
113 Resolution Acquiring Module
114 Setting Module

What is claimed is:

1. An information processing device comprising:
   an operation device for receiving an input by a user;
   a display;
   a processor for, according to the input by the user, switching and displaying, on the display, a first display image where item input fields are placed respectively at a plurality of item entry positions in an image that represents a business form and a second display image where the item input fields and supplementary information corresponding to the item input fields are placed without displaying the image that represents the business form; and
   a storage device that stores input types, positions and sizes of the item input fields, wherein
   the processor automatically groups item input fields of the same input type existing in the vicinity of one another based on the positions and sizes of the item input fields, and a predetermined position threshold, and automatically stores groups in association with an area which encompasses all of the item input fields that belong to the group, wherein a group includes a group name and a plurality of item input fields, and
   the processor receives specification of an area in the first display image by the user using the operation device when the first display image is displayed on the display and places, in the second display image, item input fields that belong to a group that corresponds to the area in the first display image specified by the user, from the item input fields placed in the first display image.

2. The information processing device according to claim 1 wherein the processor acquires longer side resolution or shorter side resolution of a display screen of the display and sets a length in a direction parallel to the item input fields of the second display image according to the resolution.

3. The information processing device according to claim 1 further comprising:
   an inclination detection device for detecting an inclination of the information processing device,
   wherein the processor switches and displays, on the display, the first display image and the second display image based on the inclination.

4. The information processing device according to claim 1, wherein the processor places the item input fields in the second display image in a same order as the item input fields placed in the first display image.

5. A display method of an information processing device including an operation device, a display and a storage device, the method comprising:
   receiving an input by a user using the operation device;
   according to the input by the user, switching and displaying, on the display, a first display image where item input fields are placed respectively at a plurality of item entry positions in an image that represents a business form and a second display image where the item input fields and supplementary information corresponding to the item input fields are placed without displaying the image that represents the business form;
   storing in the storage device, input types, positions and sizes of the item input fields;
   automatically grouping item input fields of the same input type existing in the vicinity of one another based on the positions and sizes of the item input fields, and a predetermined position threshold, and automatically storing groups in association with an area which encompasses all of the item input fields that belong to the group, wherein a group includes a group name and a plurality of item input fields;
   receiving specification of an area in the first display image by the user using the operation device when the first display image is displayed on the display; and
   placing, in the second display image, item input fields that belong to a group that corresponds to the area in the first display image specified by the user, from the item input fields placed in the first display image, in the switching and displaying step.

6. A computer-readable, non-transitory medium storing a computer program, wherein the computer program causes an information processing device including an operation device, a display and a storage device to execute a process, the process comprising:
   receiving an input by a user using the operation device;
   according to the input by the user, switching and displaying, on the display, a first display image where item input fields are placed respectively at a plurality of item entry positions in an image that represents a business form and a second display image where the item input fields and supplementary information corresponding to the item input fields are placed without displaying the image that represents the business form;

storing in the storage device, input types, positions and sizes of the item input fields;

automatically grouping item input fields of the same input type existing in the vicinity of one another based on the positions and sizes of the item input fields, and a predetermined position threshold, and automatically storing groups in association with an area which encompasses all of the item input fields that belong to the group, wherein a group includes a group name and a plurality of item input fields;

receiving specification of an area in the first display image by the user using the operation device when the first display image is displayed on the display; and placing, in the second display image, item input fields that belong to a group that corresponds to an area in the first display image specified by a user, from the item input fields placed in the first display image, in the switching and displaying step.

\* \* \* \* \*